US007219913B2

(12) United States Patent
Atley

(10) Patent No.: US 7,219,913 B2
(45) Date of Patent: May 22, 2007

(54) ARTICULATED VEHICLE WHEEL TRACKING MECHANISM

(75) Inventor: Kerry Atley, Mooroopna (AU)

(73) Assignee: Trackaxle Pty Ltd., Vicrtoria (AU)

( * ) Notice: Subject to any disclaimer, the term of this patent is extended or adjusted under 35 U.S.C. 154(b) by 325 days.

(21) Appl. No.: 10/433,061

(22) PCT Filed: Nov. 30, 2001

(86) PCT No.: PCT/AU01/01559

§ 371 (c)(1),
(2), (4) Date: May 30, 2003

(87) PCT Pub. No.: WO02/44005

PCT Pub. Date: Jun. 6, 2002

(65) Prior Publication Data

US 2004/0104555 A1 Jun. 3, 2004

(30) Foreign Application Priority Data

Dec. 1, 2000 (AU) .................................... PR1844

(51) Int. Cl.
*B62D 13/00* (2006.01)
*B62D 53/06* (2006.01)

(52) U.S. Cl. .................. 280/426; 280/400; 280/407.1; 280/419; 280/423.1; 280/442

(58) Field of Classification Search ................ 280/400, 280/406.1, 407.1, 408, 411.1, 423.1, 426, 280/419, 442, 443; 180/418
See application file for complete search history.

(56) References Cited

U.S. PATENT DOCUMENTS 2,384,092 A * 9/1945 Hollos ....................... 180/14.1

(Continued)

FOREIGN PATENT DOCUMENTS

AU 48053/85 B 3/1986

(Continued)

OTHER PUBLICATIONS

Derwent Abstract Accession No. 90-229914/30, Class Q22 SU 1533932 A, Jan. 7, 1990.
Derwent Abstract Accession No. 84-261914/42, Class Q22 SU 1074755 A, Feb. 23, 1984.
Derwent Abstract Accession No. 87-333548/47, Class Q22 SU 1303478 A, Apr. 15, 1987.

*Primary Examiner*—Christopher P. Ellis
*Assistant Examiner*—Marc A. Scharich
(74) *Attorney, Agent, or Firm*—Birch, Stewart, Kolasch & Birch, LLP

(57) ABSTRACT

The invention provides a trailer for use as part of an articulated vehicle (15) with improved cornering characteristics. The trailer includes: a main chassis (18) connectable to a wheeled section (16) of the vehicle immediately ahead of the trailer so that the trailer is rotatable relative to the wheeled section (16) about a substantially upright first axis (19) in the main chassis (18); a sub-chassis (20) having ground-engaging wheels (21) mounted thereto, the sub-chassis (20) being connected to the main chassis (18) and pivotable about a substantially upright second axis (23) in the main chassis (18); and stop means arranged for limiting rotation of the sub-chassis (20) about the second axis (23) and away from a position of a longitudinal alignment with the main chassis (18). The stop means is movable responsively to relative rotation of the wheeled section (16) and the main chassis (18) about the first axis (19). In a preferred arrangement, some wheels on the sub-chassis (20) are steerable responsively to rotation of the sub-chassis (20) about the second axis (23).

13 Claims, 16 Drawing Sheets

15
24
28
16
27
25
19
18
26
20
22
21
22
23
303

U.S. PATENT DOCUMENTS 3,092,398 A * 6/1963 Droeske ..................... 280/426
3,149,858 A * 9/1964 Le Roy ...................... 280/442
3,168,332 A * 2/1965 Eynon ..................... 280/423.1
3,290,052 A 12/1966 Stanley
3,337,234 A 8/1967 Ishizuka
3,403,743 A 10/1968 Daymon
3,533,644 A 10/1970 Humes
3,533,645 A * 10/1970 Newberry .................. 280/426
3,561,790 A 2/1971 Jurgens
3,690,698 A 9/1972 Humes
3,700,255 A 10/1972 Herbert
3,712,641 A 1/1973 Sherman
3,734,538 A * 5/1973 Humes ....................... 280/426
3,883,158 A * 5/1975 Fikse ......................... 280/404
3,899,188 A 8/1975 Curry
4,017,094 A * 4/1977 Pilcher ....................... 280/404
4,120,509 A * 10/1978 Reeve et al. ................ 280/426
4,195,863 A 4/1980 Richardson
4,441,730 A * 4/1984 Damm ....................... 280/426
4,449,726 A * 5/1984 Strifler et al. ............... 280/443
4,484,758 A 11/1984 Murray et al.
4,570,965 A * 2/1986 Caswell ...................... 280/426
4,586,578 A * 5/1986 Brown et al. ............... 280/426
4,650,205 A 3/1987 Jarlsson
4,702,488 A * 10/1987 Baillie ........................ 280/426
4,824,135 A 4/1989 McGregor
4,955,630 A 9/1990 Ogren
4,982,976 A 1/1991 Kramer
5,035,439 A * 7/1991 Petrillo ...................... 280/81.6
5,201,836 A 4/1993 DeWitt
5,207,443 A * 5/1993 Mitchell ..................... 280/426
5,213,353 A * 5/1993 Williams .................... 280/426
5,246,242 A 9/1993 Penzotti
5,366,059 A * 11/1994 Demong ..................... 198/303
5,700,023 A * 12/1997 Picard ........................ 280/426
5,784,967 A * 7/1998 Lohr ............................ 105/3
6,131,691 A * 10/2000 Morch ........................ 180/418
6,170,848 B1 * 1/2001 Wechner .................. 280/411.1
6,308,976 B1 * 10/2001 Mitchell ..................... 280/426

FOREIGN PATENT DOCUMENTS

AU 73659/87 A 12/1987
AU 35549/89 B 11/1989
AU 46271/93 1/1994
DE 1 630 626 8/1967
EP 0 001 669 A1 5/1979
EP 0 233 167 B1 8/1987
EP 0 312 815 B1 4/1989
EP 0 321 374 A1 6/1989
EP 0 282 426 B1 10/1990
EP 0 679 561 B1 11/1995
WO WO 85/03263 8/1985
WO WO 92/06881 4/1992
WO WO 95/15271 6/1995
WO WO 98/03387 1/1998
WO WO 98/21082 5/1998

* cited by examiner 400
403a
401
402
403b
-64a-
-64b-
63a
63b
65
65

ARTICULATED VEHICLE WHEEL TRACKING MECHANISM

This application is the national phase under 35 U.S.C. §371 of PCT International Application No. PCT/AU01/01559 which has an International filing date of Nov. 30, 2001, which designated the United States of America.

FIELD OF THE INVENTION

This invention relates to articulated vehicles of the type having a prime mover, or tractor, and one or more trailers.

An often-seen vehicle in this class is the so-called "semi-trailer", having a prime mover with a single trailer, the trailer usually being longer than the prime mover. The trailer typically has one, two or three non-steerable axles adjacent to its rear end and a turntable at its front end which mates with a cooperating arrangement (sometimes termed a "fifth wheel") on the prime mover so that the trailer can articulate about a substantially vertical axis of the prime mover for turning.

A number of problems arise with articulated vehicles of this type. One of these is manoeuvring. A significant width of road is required for turning corners, for example, by comparison with shorter non-articulated vehicles, and driver skill requirements may be high, because a trailer's fixed wheels generally "off track", i.e. fail to follow the path taken by the wheels of the prime mover. At least at comparatively low speeds, the trailer wheels normally track inside the path of the prime mover. These problems can be particularly acute on city roads as a turning vehicle in one lane may encroach on another lane. At high speeds tracking of the trailer wheels outside the path of the prime mover is known. However, the problem of off-tracking at comparatively low speeds is the more practically significant one, and much effort has been expended in trying to provide practical solutions.

A further problem is tyre wear due to scuffing or scrubbing on the road surface. When multiple, parallel axles are provided on the trailer, as is common, it is not possible for the axes of rotation of the trailer's wheels to converge at the centre of the trailer's turning circle, so that tyre scrubbing is inevitable. Apart from excessive tyre wear, scrubbing, leads to increased fuel consumption, and may also lead to poorer braking and roadholding.

A still further problem with semi-trailers is manoeuvrability when reversing. In tight quarters particularly, it can be difficult to manoeuvre such a vehicle as required.

The present invention is directed to at least alleviating the problems set out above. Other attempts have been made to address these problems, and many of these suffer from a further problem, namely the need for major modifications to the prime mover, by comparison with a "standard" prime mover such as would be used for conventional semi-trailers. As it is commonly required that a given trailer be towed by many different prime movers, systems not requiring major modifications to the prime mover are desirable, and the present invention provides such a system.

It should be noted that the off-tracking problem arises with vehicles having multiple trailers behind a prime mover. The invention disclosed below is also applicable in some aspects to such vehicles. Two-trailer articulated vehicles are often used in metropolitan areas, and vehicles having three or more trailers are also known, although due to their limited manoeuvrability they are normally confined to non-metropolitan roads and off-road applications.

PRIOR ART

Various approaches have been proposed for solution, or partial solution, of the closely related problems of tracking and tyre scrubbing, but a range of disadvantages appear to have prevented their widespread adoption for ordinary articulated vehicles.

One approach to reducing tyre scrubbing on trailers, but which is of very limited usefulness in improving tracking, is to provide for some wheel/axle assemblies to have fixed (non-steerable) wheels but to be free to pivot as a whole about a vertical axis placed ahead of the axle in the direction of travel, thereby to have a castoring action. See for example Sibbald, PCT/AU94/00743, and Becker and Ennor, Australian Patent No. 664919. Arrangements in this class must have some means for locking the wheel/axle assemblies in a straight-ahead orientation, or for shifting the vertical axis behind the axle, to allow for reversing. Castoring wheel assemblies have not found significant favour in practice.

The problem of reducing off-tracking of trailers has been most commonly addressed by providing arrangements whereby at least some of their wheels are "steered" during turns in an opposite sense to the steering of the prime mover. That is, if the prime mover begins a turn to the right, some wheels adjacent to the rear of the trailer are oriented to displace the rear of the trailer to the left, i.e. to the outside of the turn. If the degree of such orientation is suitably chosen, the rear of the trailer may be caused to follow substantially the path taken by the prime mover. Many of these arrangements also tend to reduce the problem of tyre scrubbing, although the degree of reduction varies widely among the various proposals.

Some of these improved tracking systems actively orient the trailer wheels, or some of them, in a way responsive to articulation between the trailer and the prime mover or responsive to steering of the prime mover's front wheels. These systems generally require a prime mover significantly different from a conventional one. These vary from very simple mechanical systems such as that of Humes, U.S. Pat. No. 3,533,644, to more complex mechanical and/or hydraulically actuated systems, for example, the system described by Kramer, U.S. Pat. No. 4,982,976.

In another class of improved tracking arrangements, reliance is placed on the tendency of the trailer's wheels to continue moving forward as the front of the trailer is displaced laterally in a turn. The consequent difference between the original path of these wheels and the new path of the trailer provides an input which can be harnessed to orient the trailer wheels to the degree required for correct tracking of the prime mover's path. Curry (U.S. Pat. No. 3,899,188) describes such a system with a fixed wheel/axle assembly (i.e. one in which the wheels are not orientable relative to the axle) at the rear of a sub-chassis and a wheel/axle assembly with individually-steerable wheels at the front of the sub-chassis. Penzotti (U.S. Pat. No. 5,246,242) describes a variation having two fixed axle assemblies on a sub-chassis. Both of these systems rely on relative movement between the trailer's main chassis and a sub-chassis due to turning for their action, and neither requires significant modification of the prime mover compared to a conventional one. This is advantageous. Both require provision for locking of the sub-chassis to the main chassis of the trailer in a straight-ahead condition for reversing purposes. Mitchell (PCT/GB97/02008) describes a comparatively complex system with two sets of individually steerable wheels and a fixed wheel/axle assembly on a sub-chassis, and having provision for providing different and selectable steering responses in forward and reverse travel.

In one aspect, the invention disclosed herein is in this class, as reliance is placed on the tendency of the trailer's wheels to continue moving forward as the front of the trailer is displaced laterally in a turn to control orientation of wheels on the trailer.

SUMMARY OF THE INVENTION

According to the invention there is provides a trailer for use as part of an articulated vehicle, the trailer including:

a main chassis pivotally connectable to a wheeled section of the vehicle immediately ahead of the trailer so that said wheeled section can articulate relative to said main chassis about a substantially upright first axis in the main chassis;

a sub-chassis having ground-engaging wheels mounted thereto, said sub-chassis being connected to the main chassis for free pivoting about a substantially upright second axis in the main chassis;

stop means adapted to define a maximum angle of said free pivoting by said sub-chassis away from a position of longitudinal alignment with said main chassis, said maximum angle being dependent on the positioning of said stop means relative to said main chassis; and stop positioning means for automatically positioning said stop means relative to said main chassis in response to articulation of said wheeled section about said first axis so that said maximum angle is variable according to the positioning of said means.

In a preferred aspect, the trailer has a plurality of pairs of ground-engaging wheels longitudinally spaced apart on said sub-chassis and includes steering means responsive to relative rotation of said sub-chassis and said main chassis about said second axis for steering at least one said pair of wheels relatively to said sub-chassis in such a sense as to tend to align said sub-chassis longitudinally with said main chassis. This arrangement can further reduce the amount of scrubbing of tyres on a road surface during turns.

A said pair of steerable wheels may be mounted to a rigid axle assembly, said axle assembly being pivotally mounted to said sub-chassis and said pair of wheels being steerable by pivoting of said axle assembly about a substantially upright third axis in said sub-chassis. The said steering means preferably includes a first link connecting said axle assembly and said main chassis or a part secured to said main chassis.

Preferably, in use on a curved path the angle of pivoting of said sub-chassis about said second axis and away from a position of longitudinal d sub-chassis alignment with said main chassis is said maximum angle. That is the sub-chassis pivots to an angle at which further pivoting is prevented by the action of the stop means.

In one embodiment, the trailer further includes:

a yoke mounted to said main chassis and bearing against said stop means; and connecting means whereby said yoke is connected to said sub-chassis and movable in said main chassis responsively to rotation of said sub-chassis about said second axis. Preferably, the yoke is mounted for substantially longitudinal movement in the main chassis and has a slide surface extending in a direction substantially transverse to the main chassis;

a slider is included in said stop means and mounted in said main chassis so as to pivot around said first axis in concert with said wheeled section pivoting about said first axis; and said slide surface bears against said slider.

Still more preferably in this embodiment, the trailer includes two said yokes and two said connecting means each connecting means associated with one of said yokes and when the sub-chassis is aligned with the main chassis for straight-ahead travel, the slider is located substantially at a transverse midpoint of the main chassis and respective said slide surfaces of both yokes bear on said slider, and the connecting means, yokes and sub-chassis are so arranged that as one said yoke moves forward the other said yoke moves backward.

The or each said connecting means may include a second link pivotally connected to the yoke and to the sub-chassis.

In a second embodiment, the invention provides a trailer including:

a member arrange for movement in response to rotation of said sub-chassis about said second axis; and movement transmitting means whereby said movement of said member causes a corresponding movement of a follower means, and wherein said corresponding movement of said follower means is limited by said stop means. This embodiment may also, and preferably does, have at least one pair of its ground engaging wheels steerable by steering means as disclosed above.

It is particularly preferred that said movement transmitting means includes first and second hydraulic actuators operatively interconnected by hydraulic fluid conduits so that actuation of said first actuator by said movement of said member produces a corresponding movement by said second actuator of said follower means. There may be further included a vessel having an internal space in fluid communication with a hydraulic fluid conduit connecting said hydraulic actuators and means whereby the volume of said space increases as hydraulic fluid pressure in said space increases.

The trailer in this embodiment may include an elongate telescopic link having a predetermined minimum length when fully inwardly telescoped, said telescopic link when telescopic to said minimum length causing said movement of said member in response to said rotation of said sub-chassis in a particular direction. Preferably, said telescopic link is one of two such telescoping links respectively disposed to cause said movement of said member in response to said rotation of said sub-chassis in opposing first and second directions, and as one said link causes said movement of said member the other said link telescopically extends in length.

The stop means in this embodiment may include a cam arranged to rotate in said main chassis about said first axis and adapted to be operatively coupled to said wheeled section.

In any of the forms disclosed above, the trailer preferably further stop means for limiting to a fixed maximum value said angular rotation of said sub-chassis about said second axis and away from said position of alignment with said main chassis.

It is also preferred that the trailer include first locking means whereby when said sub-chassis is in longitudinal alignment with said main chassis and any angular deviation from longitudinal alignment of said wheeled section and said main chassis is less than a specified value said locking means is operable to hold said sub-chassis and said main chassis in longitudinal alignment. There may be provided a user-selectable mode of operation whereby said sub-chassis is maintained in longitudinal alignment with said main chassis for only so long as said angular deviation from longitudinal alignment of said wheeled section and said main chassis remains less than said specified value.

Second locking means may also be provided which for so long as a reverse gear of said articulated vehicle is engaged locks said sub-chassis and said main chassis at such relative angular deflection about said second axis as exists when reverse gear is engaged.

In a further aspect, the invention provides an articulated vehicle including a trailer in any of the forms disclosed above.

There is also provided apparatus for operating a ground wheel steering means of a trailer mountable to a fifth wheel assembly of an articulated vehicle, said fifth wheel having a slot in which a kingpin of said trailer is receivable and retainable, said apparatus including:

a member arranged to pivot about an axis of said kingpin;

means whereby said ground wheel steering means is operated responsively to pivoting of said member about said axis;

drive means secured to said member and which depend from said trailer and are receivable in said slot.

The invention will now be described in more detail by reference to the preferred embodiments, although without any intention to limit the scope of the invention. Reference is made to the following Figures, of which:

DETAILED DESCRIPTION OF PREFERRED EMBODIMENTS

In the following description, the main inventive concept of a variable stop means applied to automatic steering of a sub-chassis on a trailer is described, first generally and then by reference to two detailed embodiments. Certain locking arrangements are then described. A particularly preferred form of sub-chassis is then described, having individually steerable axle assemblies. This is usable with either embodiment of the variable stop means. Finally a novel arrangements for connection of a trailer according to the invention to a prime mover's "fifth wheel" is described.

Figure 1:
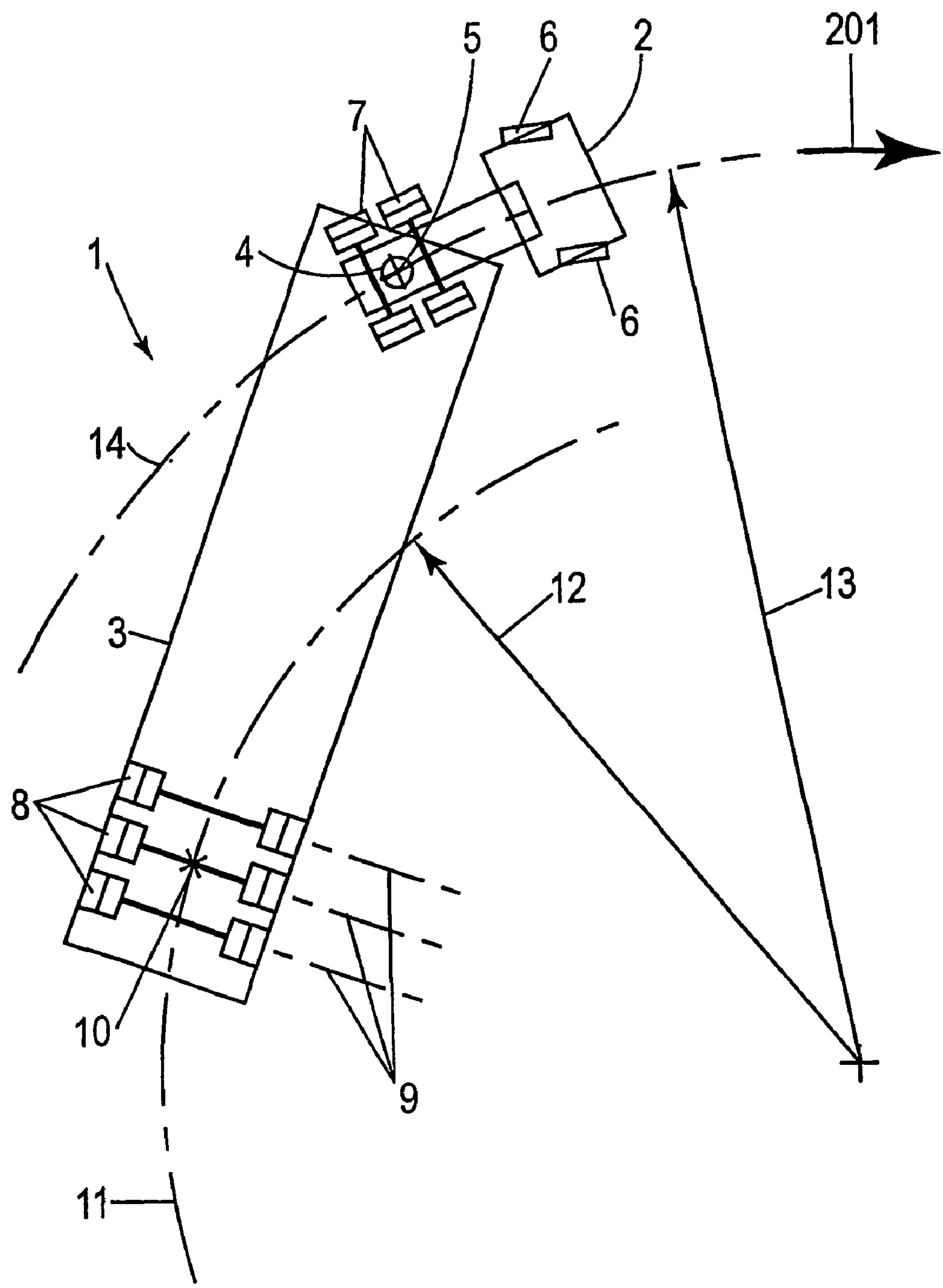
FIG. 1 is a schematic plan view of a prior art semi-trailer vehicle.

FIG. 1 shows a schematic plan view of an articulated vehicle 1 of the "semi-trailer" type, having a prime mover 2 and a trailer 3 pivotally connected to each other at a pivot 4 so that the prime mover and trailer can rotate relative to each other about an upright axis 5. Vehicles such as vehicle 1 are well known in the art. Both the prime mover 2 and the trailer 3 are shown in outline only, with mechanical detail omitted. The prime mover 2 has a pair of steerable wheels 6 and two pairs of driven ground-engaging wheels 7, although other numbers of driven wheels are also known. The trailer 3 has three pairs of non-driven ground-engaging wheels 8 near its rear end, which are not steerable. That is, their axes of rotation 9 are held substantially transverse to the length of the trailer 3. This arrangement is well known and conventional in the art. Semi-trailers are also commonly used which have two pairs or even one pair of rear wheels instead of the three pairs 8.

The vehicle 1 is shown in FIG. 1 established in a turn while travelling forward. The arrow 201 shows the direction of travel. A point 10 in the vicinity of the wheels 8 is travelling on a curved path 11 whose radius 12 is less than the radius 13 of a path 14 traced out by the pivot 4. This phenomenon is found in practice, at least at low and moderate speeds, and is the form of "offtracking" most commonly seen in practice. Apart from presenting difficulties in manoeuvring, it involves scrubbing of at least some (and in general all) of the wheels 8 as they are simultaneously rolling and sliding sideways.

Figure 2:
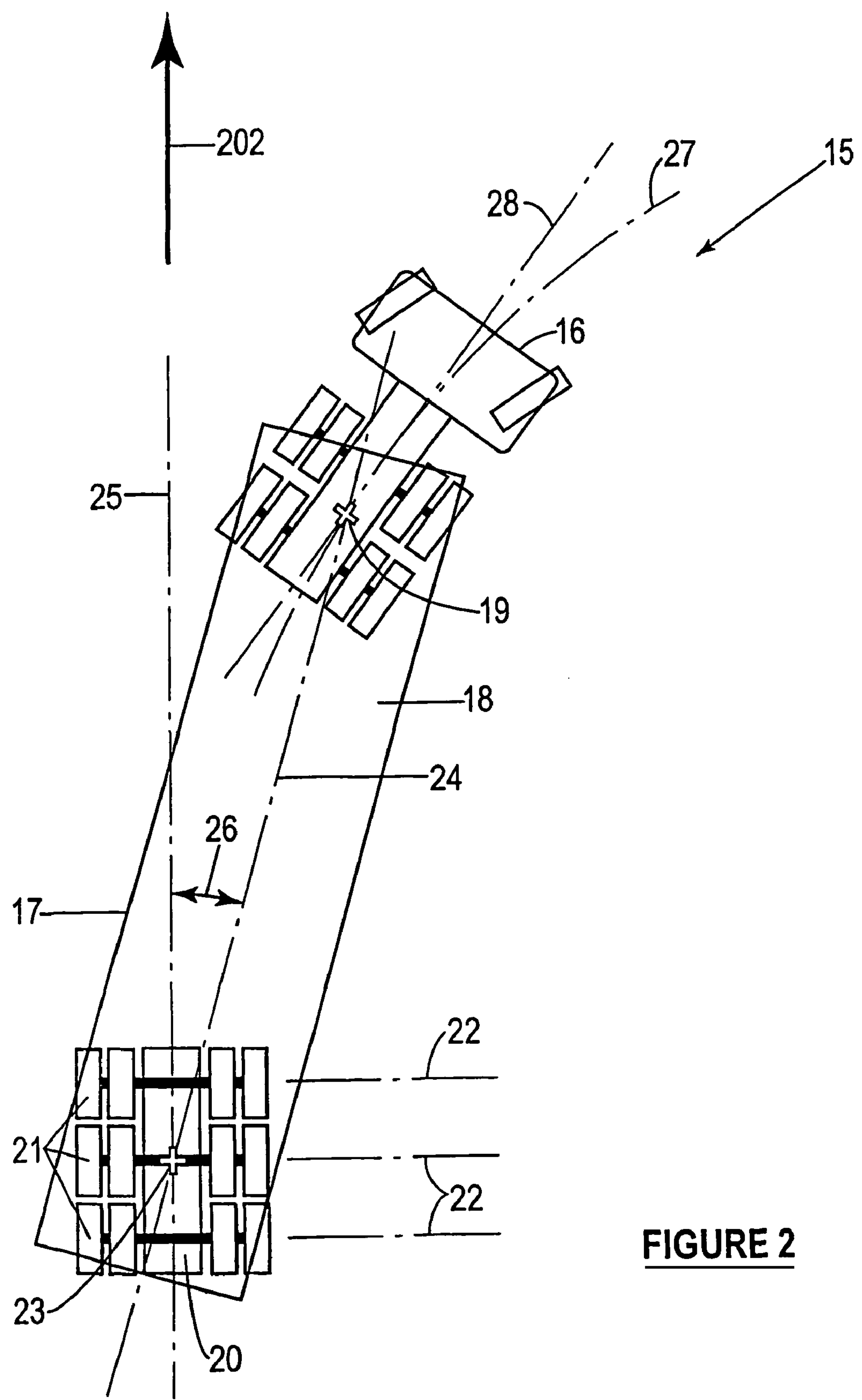
FIG. 2 is a schematic plan view of a modified semi-trailer vehicle.

FIG. 2 shows, also in a schematic plan view, a vehicle 15 which is similar to the vehicle 1. Vehicle 15 has a prime mover 16 and a trailer 17. The trailer 17 includes a main chassis 18 mounted to the prime mover 16 for pivotal relative rotation about an upright axis 19. The main chassis 18 is also pivotally mounted for relative rotation about an upright axis 23 on a sub-chassis 20, to which, in turn, there are mounted three pairs of wheels 21. The wheels 21 are not steerable relative to the sub-chassis 20, their axes of rotation 22 lying transversely to the sub-chassis 20.

Suppose now that the sub-chassis 20 is completely free to rotate about axis 23, and suppose further that the vehicle 15 is at first travelling straight ahead with the main chassis 18, the sub-chassis 20, and prime mover 16 longitudinally aligned, i.e. with longitudinal axes 24, 25 and 28 respectively, in line with each other. FIG. 2 shows the situation shortly after the prime mover 16 of vehicle 15 begins a turn to the right from an original straight-ahead direction indicated by arrow 202. Because relative rotation of main chassis 18 and sub-chassis 20 about axis 23 is unrestrained, the sub-chassis 20 tends to continue in direction 202, so that an angle 26, between axes 24 and 25, increases as the vehicle 15 moves forward. In the absence of any restraint, angle 26 will increase to a large value, at which unpredictable and uncontrollable behaviour will begin. However, at the early stage of turning shown in FIG. 2, it can be said that trailer 17 is not off-tracking inwardly in the way shown in FIG. 1 for trailer 3. To the contrary, trailer 17 is moving toward a position outside path 27 of axis 19 of the prime mover.

Figure 3:
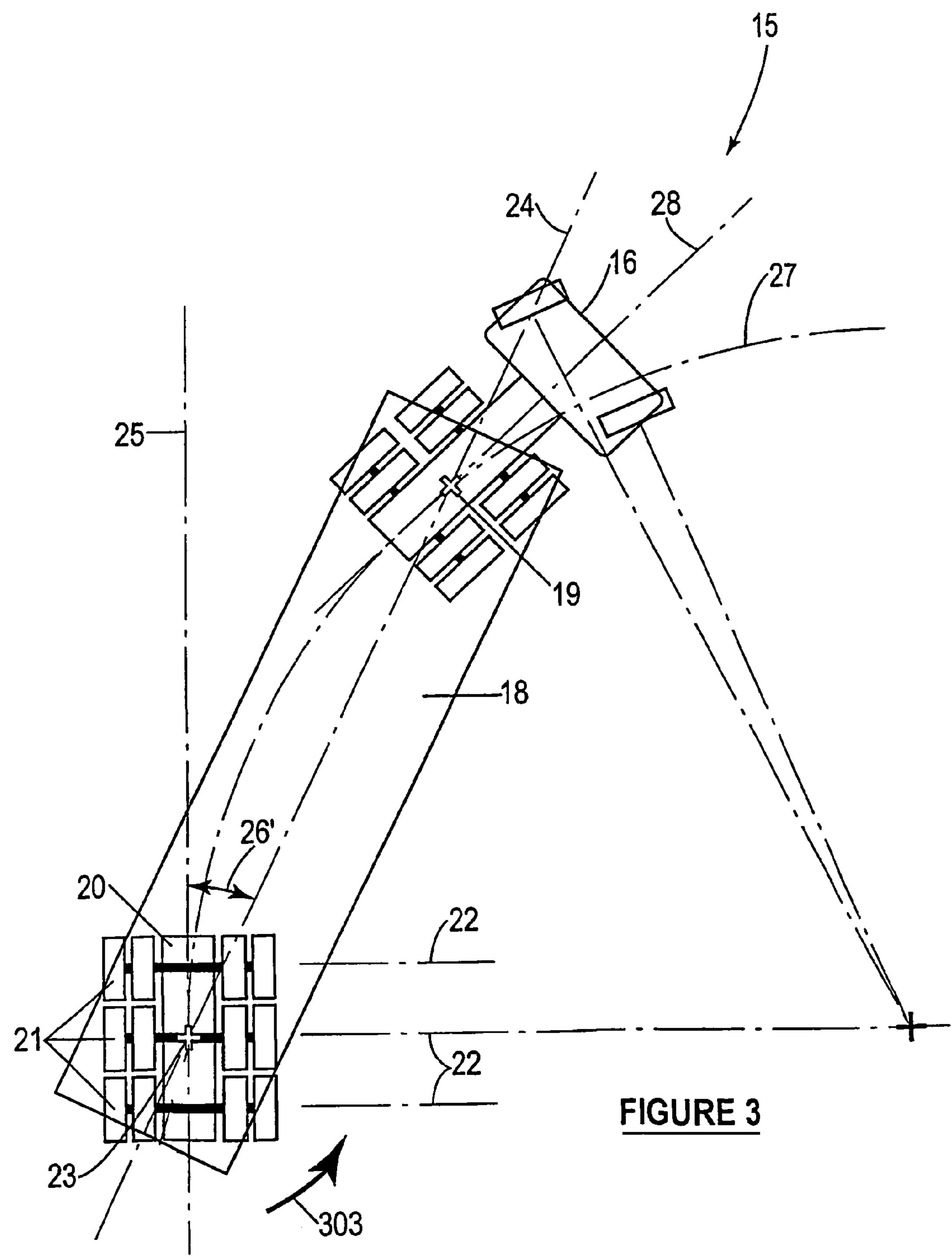
FIG. 3 is a schematic plan view of a semi-trailer according to the invention.

The arrangement shown in FIG. 2 is unstable and not practical. However, suppose now that in the vehicle 15 the rotation of the sub-chassis 20 about axis 23 is restrained in such a way that the angle 26, once it reaches a chosen maximum value 26', cannot increase further. In this case, it is found that pivot axis 23 follows a path intermediate between the two situations shown in FIGS. 1 and 2. For a given prime mover path 27, a suitable angle 26' can be chosen so that once a turn is established, pivot axis 23 will follow substantially the same path. That is, there will be substantially no off-tracking of the types shown in FIGS. 1 and 2. FIG. 3 shows this situation.

The value of angle 26' which gives correct tracking in a steady established turn, as shown in FIG. 3, depends on the radius of the prime mover path 27, which is itself a variable chosen by a driver of the vehicle 15. Therefore, the invention provides for the angle 26' to be set by variable stop means (preferred embodiments of which are to be described in detail below) arranged so that angle 26' varies according to the sharpness of turning. The sub-chassis 20 rotates about the axis 23 during turns in the way described above, tending towards a straight path, until the angle 26 reaches the value 26' set by the stop means.

In the arrangement shown in FIG. 3, some scrubbing of wheels 21 is inevitable, albeit less than in a conventional vehicle such as vehicle 1, because the wheels 21 are being prevented from rolling along a straight path, and with three parallel axes of rotation 22, rolling without sliding on any curved path is not possible. The effect of wheel scrub in the situation shown in FIG. 3 is found to be that there is a torque applied to the sub-chassis 20 in a direction shown by arrow 303, which tends to increase the angle 26.

Wheel scrub during turning can be further alleviated, by combining the above invention with a different type of sub-chassis, which will be described in outline here and in detail later. This different sub-chassis type is also usable with other trailer steering arrangements and is an invention in itself, independently of the invention described above.

Figure 4:
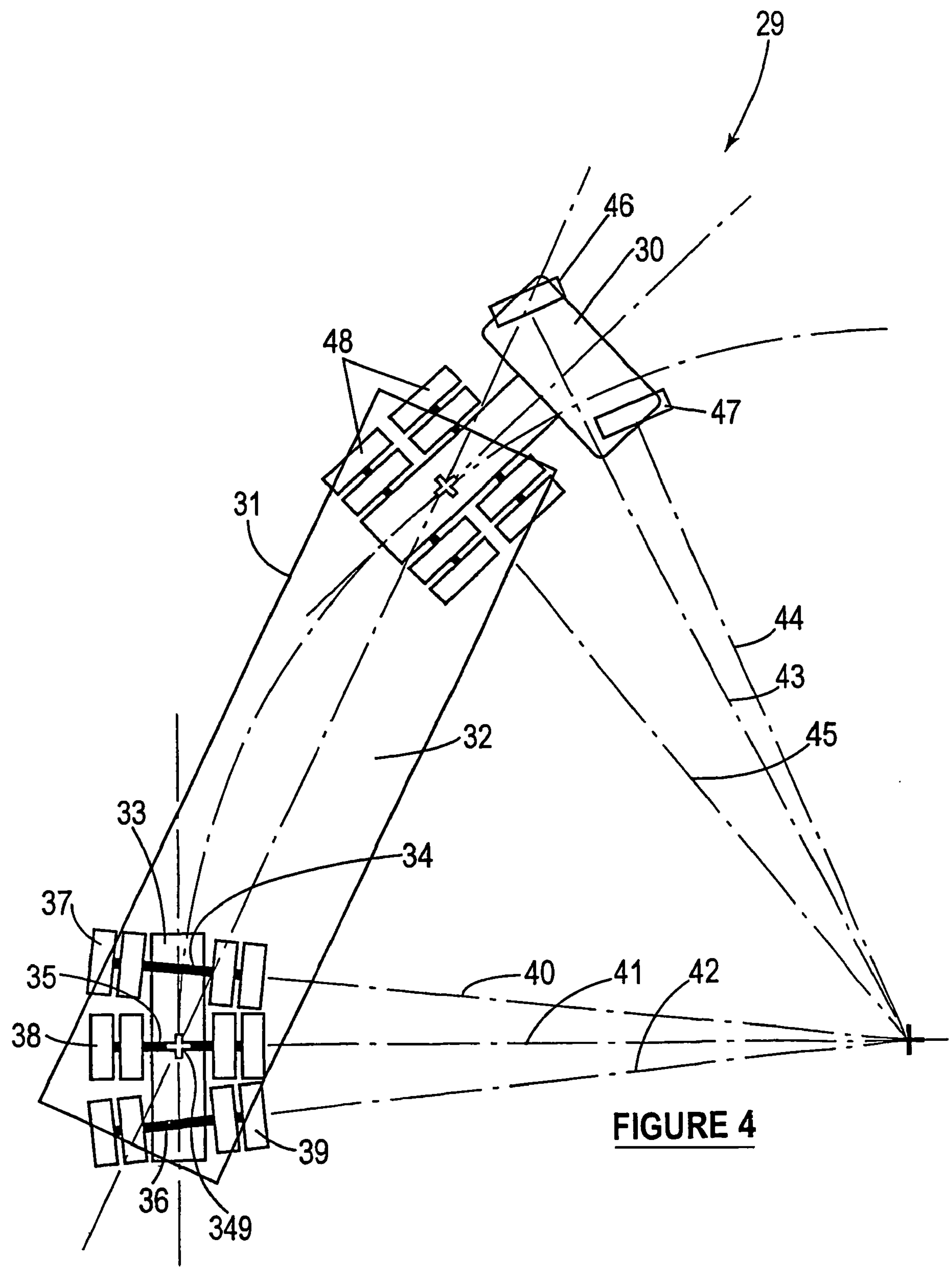
FIG. 4 is a schematic plan view of a further semi-trailer according to the invention.

FIG. 4 shows a semi-trailer vehicle 29 incorporating the different sub-chassis 33 and having a prime mover 30 and a trailer 31. The trailer 31 has a main chassis 32 pivotally connected to sub-chassis 33 for relative rotation about a substantially upright axis 349 in the main chassis 32. To the sub-chassis 33 are mounted three rigid axles 34, 35 and 36. To the axles are mounted ground-engaging wheel pairs 37, 38 and 39 respectively, which have axes of rotation 40, 41 and 42 respectively. (Although three pairs of wheels are shown in FIG. 4, two or four pairs could in fact be used if required.) The axle 35 is mounted non-steerably on the sub-chassis 33, i.e. so that the axis of rotation 41 of wheels 38 is transverse to sub-chassis 33. However, axles 34 and 36 are mounted pivotally to sub-chassis 33 so that wheel pairs 37 and 39 are steerable relative to sub-chassis 33 as shown in FIG. 4. Steering means (to be described in detail below) are provided whereby, in response to the sub-chassis 33 rotating about axis 349 away from a position of longitudinal alignment with the main chassis 32, axles 34 and 36 are centrally pivoted so that their the axes of rotation 40 and 42 converge toward axis 41 on one side of the sub-chassis 33. Specifically, the axes 40, 41 and 42 converge towards each other on the inside of the turn being executed. In the idealized situation shown in FIG. 4, axes 40, 41 and 42 converge with axes of rotation 43, 44 and 45 of prime mover wheels 46, 47 and 48. (Axis 45 is an average axis of rotation of the driven wheels 48 of prime mover 30.) However, in practice perfect convergence of the axes 40 to 42 and 43 to 45 as shown in FIG. 4 is not required for tracking and wheel scrub to be significantly improved by comparison with a conventional vehicle such as vehicles 1 and 15.

In FIG. 4, angle 159', between longitudinal axes 160 and 161 of the main chassis 32 and sub-chassis 33 corresponds to angle 26' in FIG. 3.

Through use of the different sub-chassis 33, rather than the sub-chassis 20, in combination with the variable stop means mentioned above (and described below) a larger reduction in wheel scrub can be achieved while still obtaining the improved tracking that the variable stop means can provide. This is because pure rolling, as opposed to combined rolling and sliding, of the trailer wheels 37, 38 and 39 is more nearly approachable.

Variable Stop Means

Variable stop means will be described using as an example the vehicle 15 shown in FIG. 3. However, it is to be understood that the vehicle 29 shown in FIG. 4, with steerable axles on sub-chassis 33, could equally be used as a basis for the description, and the variable stop means is equally applicable to vehicles such as vehicle 29. Several embodiments of the variable stop means will be described.

(a) Fully Mechanical Variable Stop Means

Figure 5:
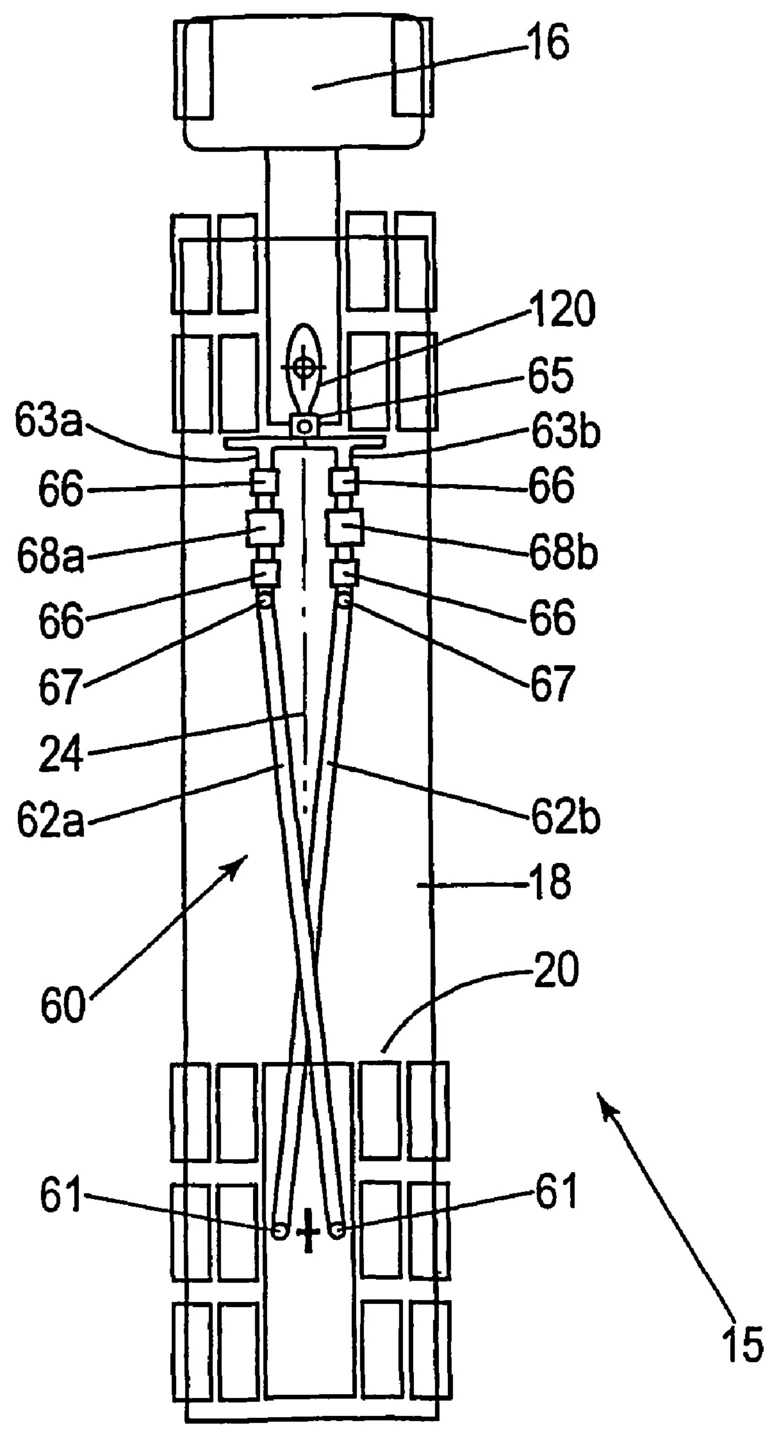
FIG. 5 is a schematic plan view of the vehicle shown in FIG. 3 in straight-ahead configuration.
Figure 6:
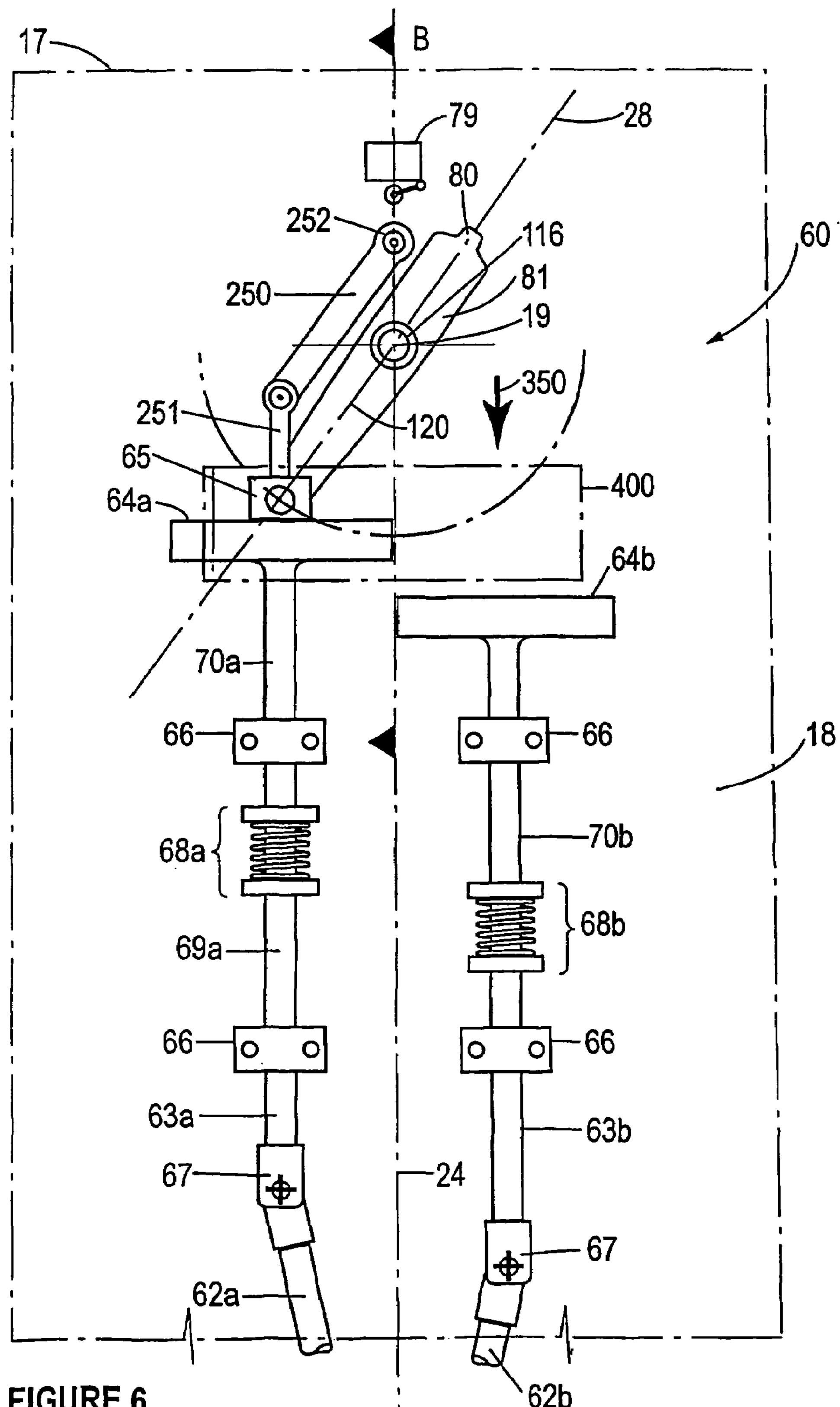
FIG. 6 is a schematic partial plan view of the vehicle shown in FIG. 5, in a turning configuration.

FIG. 5 shows in schematic plan view the vehicle 15 with prime mover 16, main chassis 18 and sub-chassis 20 longitudinally aligned, as for straight-ahead travel. Vehicle 15 is shown fitted with a fully mechanical variable stop means generally indicated as item 60. FIG. 6 shows in plan view, with some structural detail omitted, a larger-scale partial view of the vehicle 15 with means 60, now in a configuration corresponding to a right turn.

Secured to the sub-chassis 20 via pivots 61 are two equal-length rods 62*a* and 62*b*. (The suffixes "a" and "b" here indicate separate components which are the same save for being oppositely located relative to the main chassis central axis 24. The same convention is used for other items in the following description.) The pivots 61 are symmetrically located on opposite sides of longitudinal axis 25 of the sub-chassis 20. The rods 62*a* and 62*b* are pivotally connected at pivots 67 to yokes 63*a* and 63*b*, respectively, and do not contact each other where they cross (see FIG. 5). Yokes 63*a* and 63*b* are mounted in linear bearings 66 on the main chassis 18 and are free to slide parallel to axis 24 of the main chassis 18. Yoke 63*a* moves forward and yoke 63*b* backward as the sub-chassis 20 rotates anticlockwise (seen from above, relative to the main chassis 18) about axis 23. Conversely as sub-chassis 20 rotates clockwise yoke 63*b* moves forward and yoke 63*a* moves backward. When sub-chassis 20 is in the straight-ahead position shown in FIG. 5, transversely-extending slide surfaces 64*a* and 64*b* on yokes 63*a* and 63*b* are aligned, and lying against both is a slider 65. Slider 65 is pivotally mounted on a radius arm 120 which is in turn pivotally mounted to revolve about an upper extension of king pin 116 of the trailer 17, the kingpin 116 being coaxial with the axis 19. By means described below, radius arm 120 is arranged always to remain aligned with axis 28 of the prime mover 16.

Accordingly when prime mover 16 begins a right turn, radius arm 120 rotates clockwise, as seen from above by an observer on the main chassis 18, so that slider 65 moves left and forward (also as seen by the observer) as shown in FIG. 6. At the same time, sub-chassis 20 rotates anticlockwise in the way described above, so that yoke 63*a* moves forward and yoke 63*b* moves backward. However, the extent of rotation of sub-chassis 20 is limited by the slide surface 64*a* of yoke 63*a* bearing against slider 65 and it is this which sets the angle 26', between axes 24 and 25 of the main chassis 18 and sub-chassis 20. When the prime mover 16 and trailer 17 are aligned for straight-ahead travel, the value of angle 26' is zero. As the prime mover 16 articulates progressively more about axis 19, angle 26' increases continuously. During turning, what prevents sub-chassis 20 from rotating unrestrained at angles 26 less than the value 26' is the tendency of sub-chassis 20 to continue in a straight path—enough wheel scrub develops to urge slider surface 64*a* against slider 65, although less than in conventional semi-trailer vehicle 1 executing a similar turn.

A right turn has been described above. It will be apparent that the symmetrical arrangement of components ensures similar operation during left hand turns.

A number of refinements to this basic scheme are provided for enhanced effectiveness. These will now be described.

Figure 7:
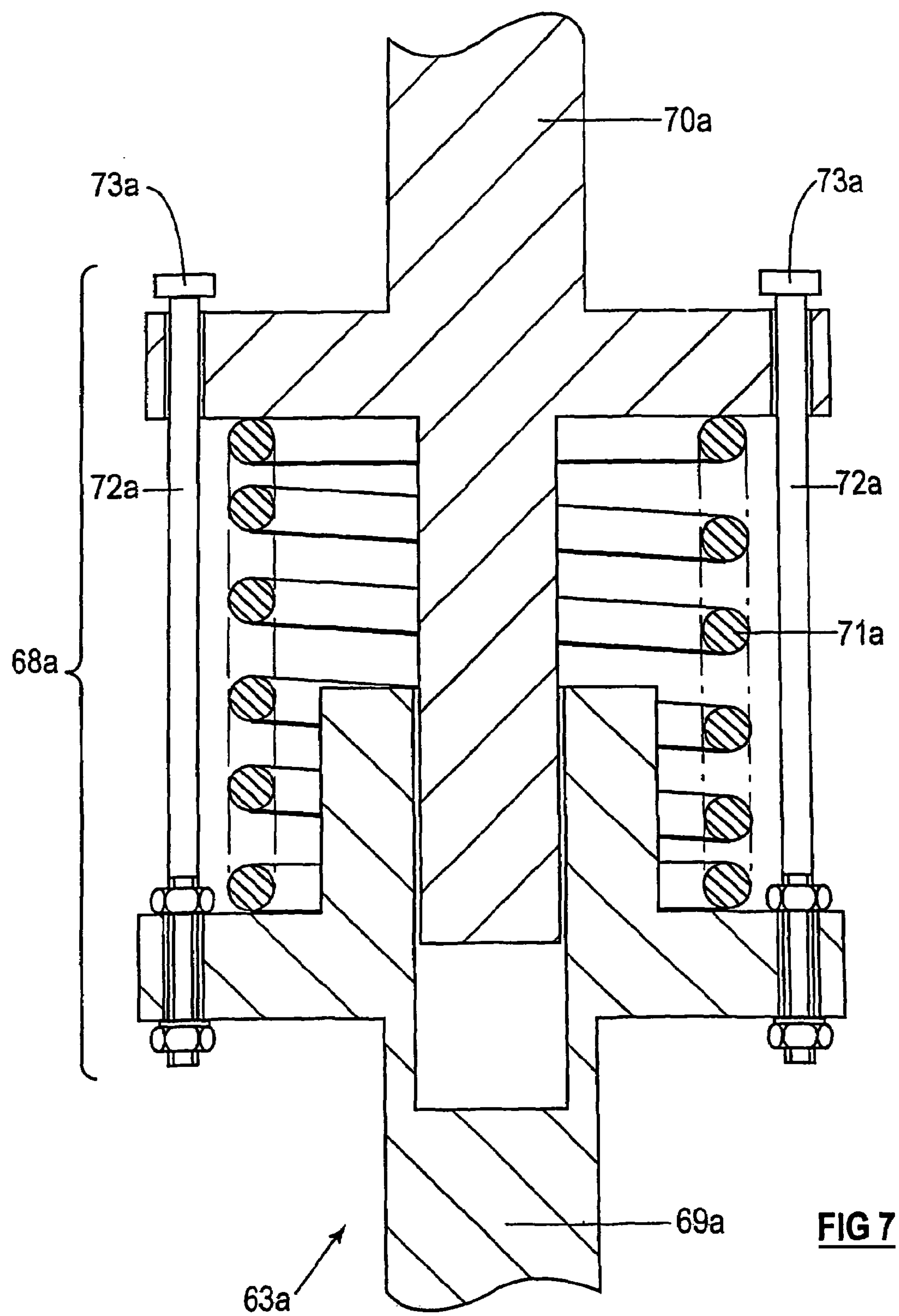
FIG. 7 is a cross-sectional view of a component of the vehicle shown in FIG. 6.

In low-speed manoeuvring particularly, a driver may suddenly decrease the sharpness of a turn being executed by the prime mover 16. Very large forces between the slider surface 64*a* (or 64*b*) and slider 65 can then arise, as the sub-chassis 20 takes some travel distance to adjust to a new degree of turning. (This situation is analogous to the large increase in steering effort experienced by the driver of a motorcar when rapidly changing the radius of a turn at very low speeds.) To limit this effect, yokes 63*a* and 63*b* include identical resilient sections 68*a* and 68*b* respectively. FIG. 7 shows one of these, 68*a*, in cross-section. (The other, 68*b*, is identical).

A first component 69*a* slides telescopically on a co-axial second component 70*a* and components 69*a* and 70*a* are urged apart by a coil spring 71*a* between them. Rods 72*a* are secured to component 69*a* and free to slide within component 70*a*. Stops 73*a* on rods 72*a* prevent components 69*a* and 70*a* actually separating. Spring 71*a* is under a predetermined compression force (preload) when components 69*a* and 70*a* are as far apart as stops 73*a* permit. In a sudden decrease of the tightness of a turn at a low forward travel speed, excessively large forces in the yoke 63*a* do not develop, as its components 69*a* and 70*a* slide towards each other, compressing spring 71*a*. As the turn continues, the sub-chassis 20 adjusts to a new position. During this adjustment process, angle 26 can temporarily exceed the angle 26' that corresponds to any instantaneous position of the slider 65.

If on the other hand a sudden increase in the tightness of a turn is made, as can also happen particularly during low-speed manoeuvring, the slider 65 can cease to be in contact with slide surface 64*a* (or 64*b*), but the sub-chassis 20 then simply rotates further, following its natural tendency to roll straight ahead, until contact is regained. In this case, the slider 65 is kept oriented correctly relative to the slide surfaces 64*a* and 64*b* by a link 250 which is pivotally connected to an arm 251 on slider 65 and at pivot point 252 to main chassis 18, to form a parallelogram linkage.

The resilient sections 68*a* and 68*b* have another purpose. When the sub-chassis 20, the main chassis 18 and the prime mover 16 are aligned straight ahead, the springs 71*a* and 71*b* are slightly compressed, so that there is a small preload between surface 64*a* and slider 65 and between surface 64*b* and slider 65. This takes up clearances in the system, so that smooth operation is obtained without the manufacturing difficulties of avoiding clearances between the yokes 63*a* and 63*b* and slider 65.

Figure 8:
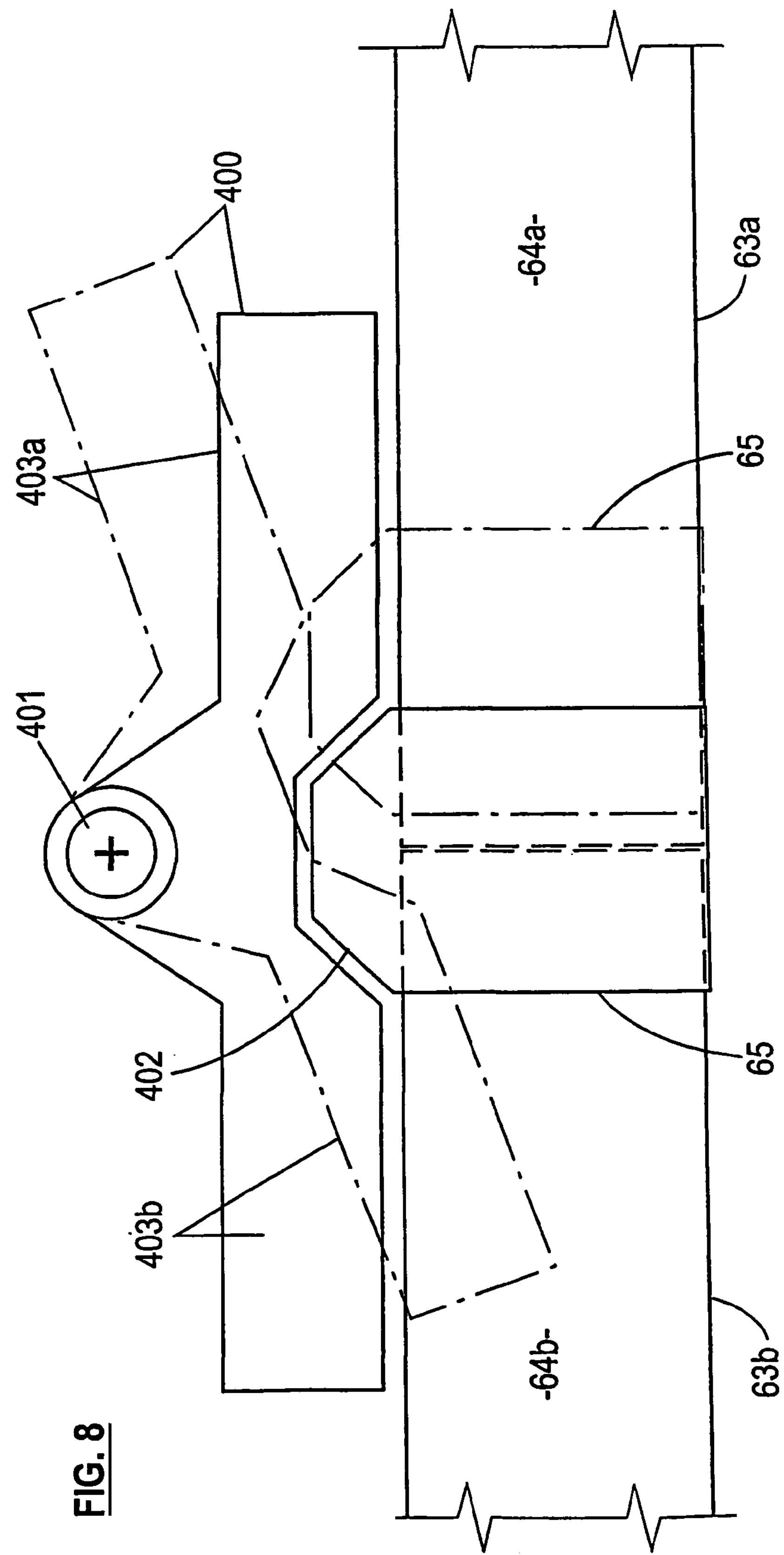
FIG. 8 is a schematic, partial elevation taken in the direction of arrow "350" in FIG. 6.

The preloading of springs 71*a* and 71*b* has a consequence that must be dealt with. As a right turn (for example) is initiated from a straight-ahead configuration of the vehicle 15, slider 65 moves laterally so that it remains in contact with slide surface 64*a*, but leaves contact with slide surface 64*b*. The preload in spring 71*b* thus causes face 64*b* to move slightly forward until stops 73*b* contact component 70*b*. As the angle of turn increases and yoke 63*a* moves forward, yoke 63*b* moves back so that slide surface 64*b* moves back. However, for very small angles of turn, the small forward movement of face 64*b* due to relaxing of preload in spring 71*b* can exceed the offsetting rearward movement of yoke 63*b*, so that there is potential for interference between slider 65 and yoke 63*b* as slider 65 returns to a central position. The opposite occurs in a left turn. This effect is avoided by a rocking latch 400 which is mounted to the main chassis 18 for pivotal movement about a horizontal pin 401 which is parallel to axis 24 of the trailer 17 and fixed in a transversely central position in trailer 17. Latch 400 is shown in phantom outline in FIG. 6 and in FIG. 8 as seen by an imaginary observer looking along arrow 350 in FIG. 6. Extraneous detail has been omitted from FIG. 8. As a right turn is initiated, a formation 402 of slider 65 bears on the latch 400, pivoting it about pin 401 so that a part 403*b* of latch 400 swings down and prevents face 64*b* moving further forward than the position it has when the slider 65 is centralized, while a part 403*a* swings up to allow yoke 63*a* to move forward. Thus slider 65 can be centralized without interference with yoke 63*b*. In a left turn, latch 400 swings the other way so that part 403*a* prevents slide surface 64*a* moving forward of the position it has when slider 65 is centralized.

It is not desirable in practice for the angle 26' between the axes 24 and 25 to become too large—30 degrees has been found a suitable absolute maximum value. Suitable mechanical stops (not shown) are therefore provided on main chassis 18 to limit left or right rotation of sub-chassis 20. However, these do not prevent the prime mover 16 taking up angles of articulation relative to the main chassis 18 which would otherwise lead to larger angles 26' than the stops permit. In such cases, the slider 65 can simply cease to be in contact with the slide surface 64*a* or 64*b*. When the prime mover 16 returns to a more-nearly-straight-ahead position, slider 65 again contacts slide surface 64*a* or 64*b*.

(b) Mechanical/Hydraulic Variable Stop Means

This alternative embodiment will also be described by reference to vehicle 15 shown in FIG. 3, again emphasizing that it is also applicable to vehicle 29. Instead of the variable stop means 60, a variable stop means is provided on trailer 17 which includes subsystems 410 (at rear of main chassis 18) and 411 (at front of main chassis 18).

Figure 13:
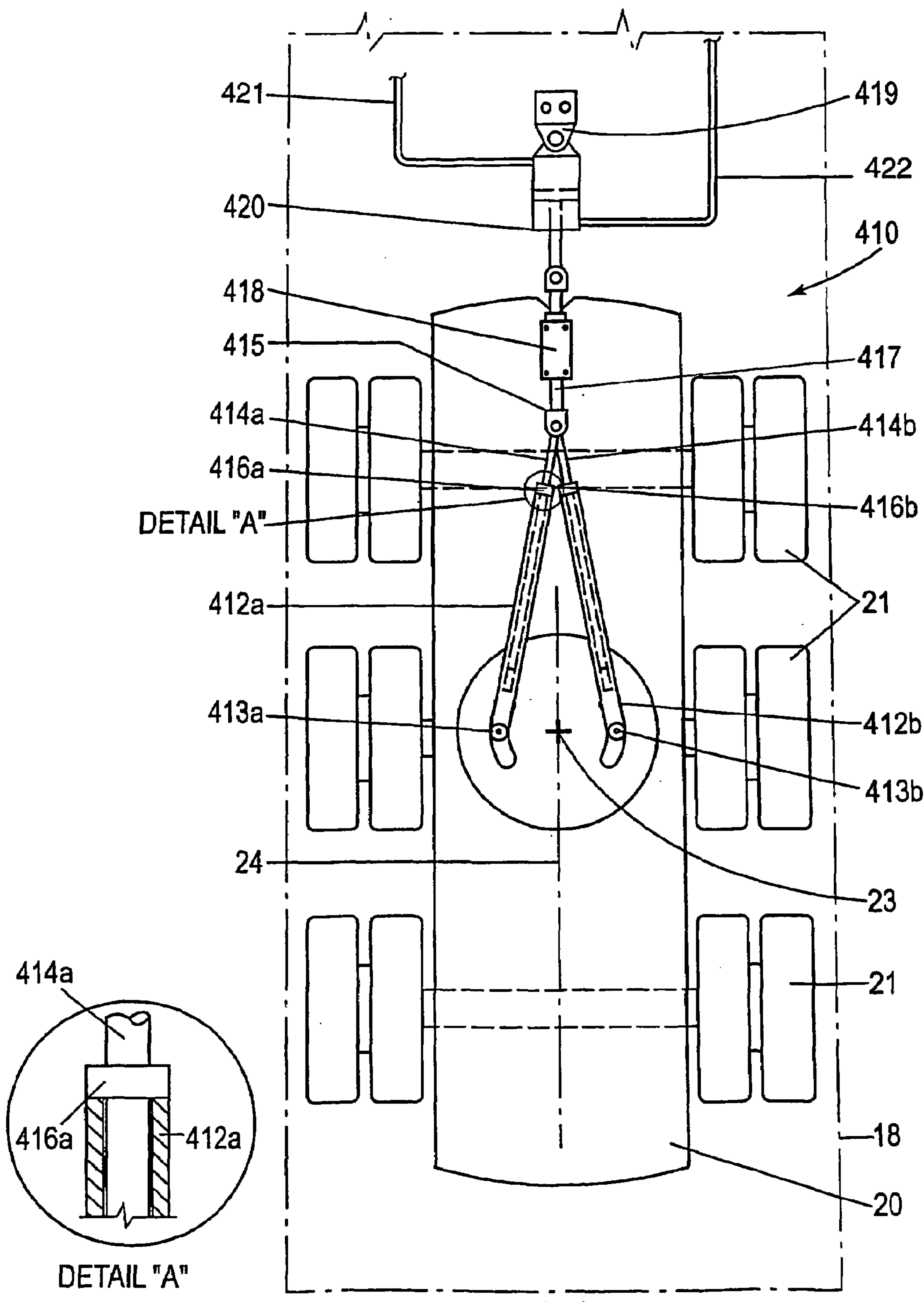
FIG. 13 is a schematic partial plan view of the vehicle shown in FIG. 3, with an alternative variable stop means according to the invention. One part of the Figure is an enlarged view of detail "A" in FIG. 13.

FIG. 13 is a schematic plan view of the rear of main chassis 18 with extraneous mechanical detail omitted, intended to show the layout of major components of subsystem 410. Sub-chassis 20 is pivotally mounted to main chassis 18 for rotation about upright axis 23 and has three wheel pairs 21.

Sleeve members 412*a* and 412*b* are secured to sub-chassis 20 via pivots 413*a* and 413*b*, so that they can pivot about upright axes of rotation through pivots 413*a* and 413*b*. Except at the pivots 413*a* and 413*b*, sleeve members 412*a* and 412*b* are of tubular form. Rod members 414*a* and 414*b* are mounted to a clevis fitting (fork) 415 and are slideable within sleeve members 412*a* and 412*b*. Rod members 414*a* and 414*b* have stops 416*a* and 416*b* partway along their length which limit the distance they can penetrate into their respective sleeve members 412*a* and 412*b*.

Clevis fitting 415 is at the rear end of a slide 417 which is able to slide in a guide 418 fixed on the longitudinal centreline 24 of main chassis 18. Connected between the front end of slide 417 and a fitting 419 fixed on the longitudinal centreline 24 of the main chassis 18 is a hydraulic ram 420. As slide 417 moves forward, fluid in the head end of ram 420 is pumped into a tube 421 and fluid in a tube 422 is drawn into the rod end of ram 420. The reverse happens as slide 417 moves backward.

Figure 14:
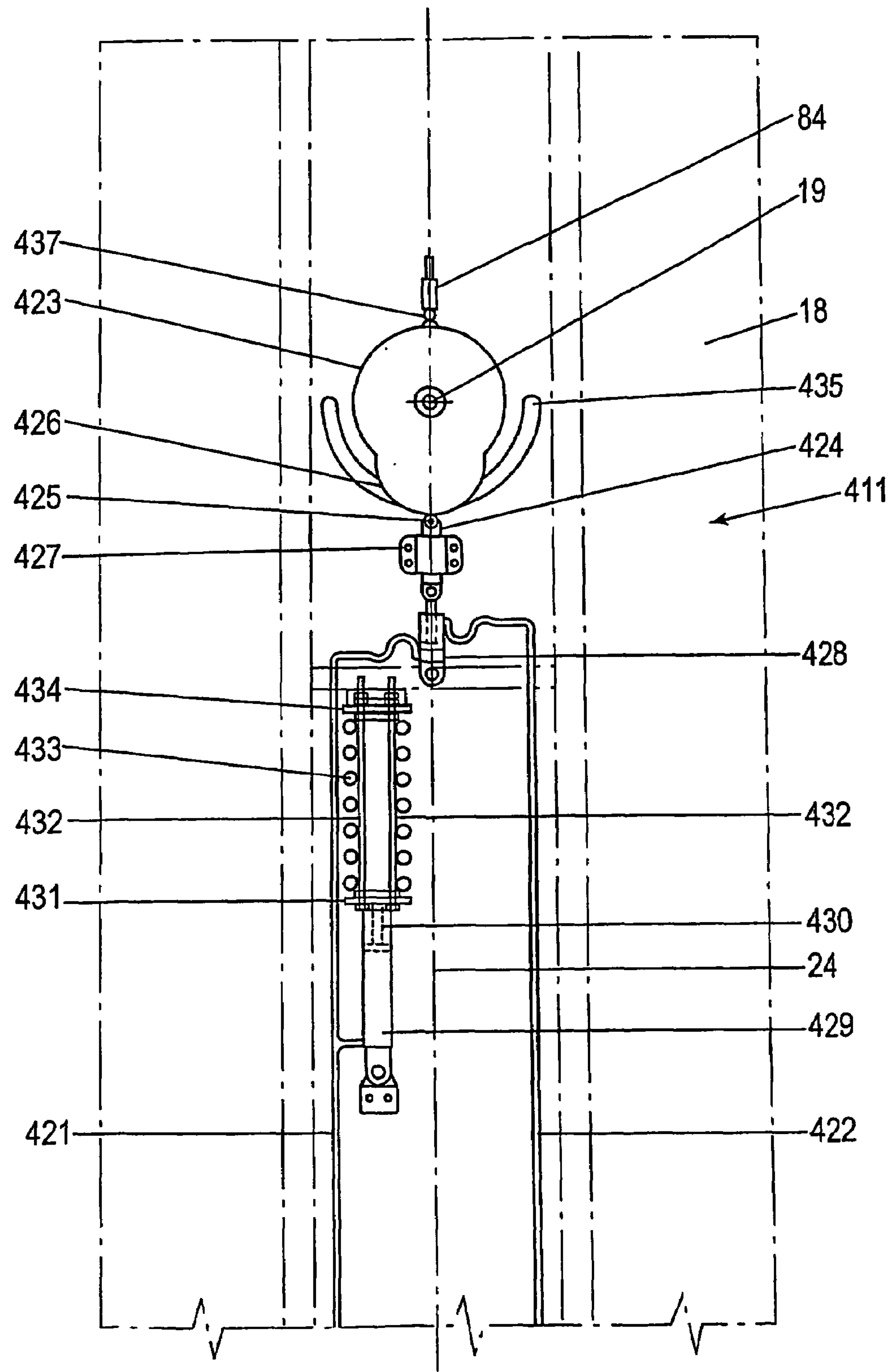
FIG. 14 is a schematic partial plan view of the vehicle shown in FIG. 3, with an alternative variable stop means according to the invention.

Referring now to FIG. 14, the subsystem 411 at the front end of main chassis 18 is shown in a schematic plan view with extraneous detail omitted. A shaped cam plate 423 is provided within the main chassis 18 but arranged (by means described below) to rotate, relative to the main chassis 18, in concert with the prime mover 16 about the upright axis 19. That is, an observer on the main chassis 18 sees cam plate 423 rotate about axis 19 relative to main chassis 18 as the prime mover 16 executes turns.

A slide 424 has a cam follower roller 425 on its forward end which bears against shaped edge 426 of cam plate 423. Slide 424 is able to slide within a guide 427 secured along the longitudinal centreline 24 of main chassis 18. Secured to the rear end of slide 424 is a hydraulic ram 428. Tubes 422 and 421 extend forward from ram 420 and are connected to the rod end and head ends respectively of ram 428.

A third hydraulic ram 429 is provided and is single-acting, with its head end connected to tube 421 between rams 420 and 428. The piston rod 430 of ram 429 is secured to a slider 431 which is able to slide along guide rods 432 secured to the main chassis 18. A compression force is maintained in piston rod 430 by preload in a coil spring 433 which extends between slider 431 and a plate 434 on main chassis 18. By this means, hydraulic fluid in subsystems 410 and 411 is pressurized enough for sliders 417 and 424 to be urged backward and forward, respectively and take up clearances in subsystems 410 and 411. Specifically, when the prime mover 16, main chassis 18 and sub-chassis 20 are aligned in the straight-ahead position, cam follower roller 425 is held in contact with edge 426 of cam plate 423, and slider 417 and rod members 414*a* and 414*b* are pushed backwards until stopped by engagement between stops 416*a* and 416*b* with sleeve members 412*a* and 412*b*, respectively.

Cam plate 423 is lobe-shaped, with varying radius about axis 19, so that as it rotates in concert with prime mover 16, away from the straight-ahead position to a turned position, cam follower roller 425 is able to move progressively further forward. Taking a right turn of vehicle 15 as an example, the natural tendency of sub-chassis 20 to roll straight ahead means that sleeve member 412*b* pushes against stop 416*b*, so that slider 417 moves forward and hydraulic fluid is pumped between ram 420 and ram 428. This results in slider 424 moving forward also, a movement limited by contact between roller 425 and cam plate 423. In this way, allowable rotation of sub-chassis 20 is limited to an angle 26' (between axes 24 and 25) that varies with the angle between the prime mover 16 and main chassis 18.

Note that the degree of preload and the force per unit deflection (spring rate) of spring 433 are so chosen that during normal turning there is no significant tendency for hydraulic fluid displaced from ram 420 to be taken up by ram 429. However, circumstances such as sharp reductions of turning angle of the prime mover 16 at low speeds (as discussed above) do not lead to excess pressures in the hydraulic fluid, as ram 429 can take up fluid in these circumstances with a corresponding deflection of spring 433. Ram 429 and spring 433 are here providing the same function as resilient sections 68*a* and 68*b* of system 60. In an analogous way, a sharp increase of turning angle at low speeds simply causes roller 425 to separate from cam plate 423 temporarily. When hydraulic fluid; enters ram 429, line 422 requires make-up fluid. This can be provided in several ways. One is to connect the rod end of ram 429 to line 422 if rams 420, 428 and 429 have the same bore and rod diameters (not shown). Another is to vent line 422 to a reservoir maintained at a low pressure (hydraulic accumulator) (not shown). Rams 420, 428 and 429 could also be single acting.

It will be appreciated that sliders 417 and 424 could, instead of being hydraulically coupled as described above, be joined by a rod (not shown) extending along axis 24 of the main chassis 18, the rod having a resilient element therein (not shown) operating on the same principle as 68*a* and 68*b*. Such a system would be an alternative to system 60 and is within the scope of the invention.

Locking of Sub-chassis to Main Chassis of Trailer

Figure 9:
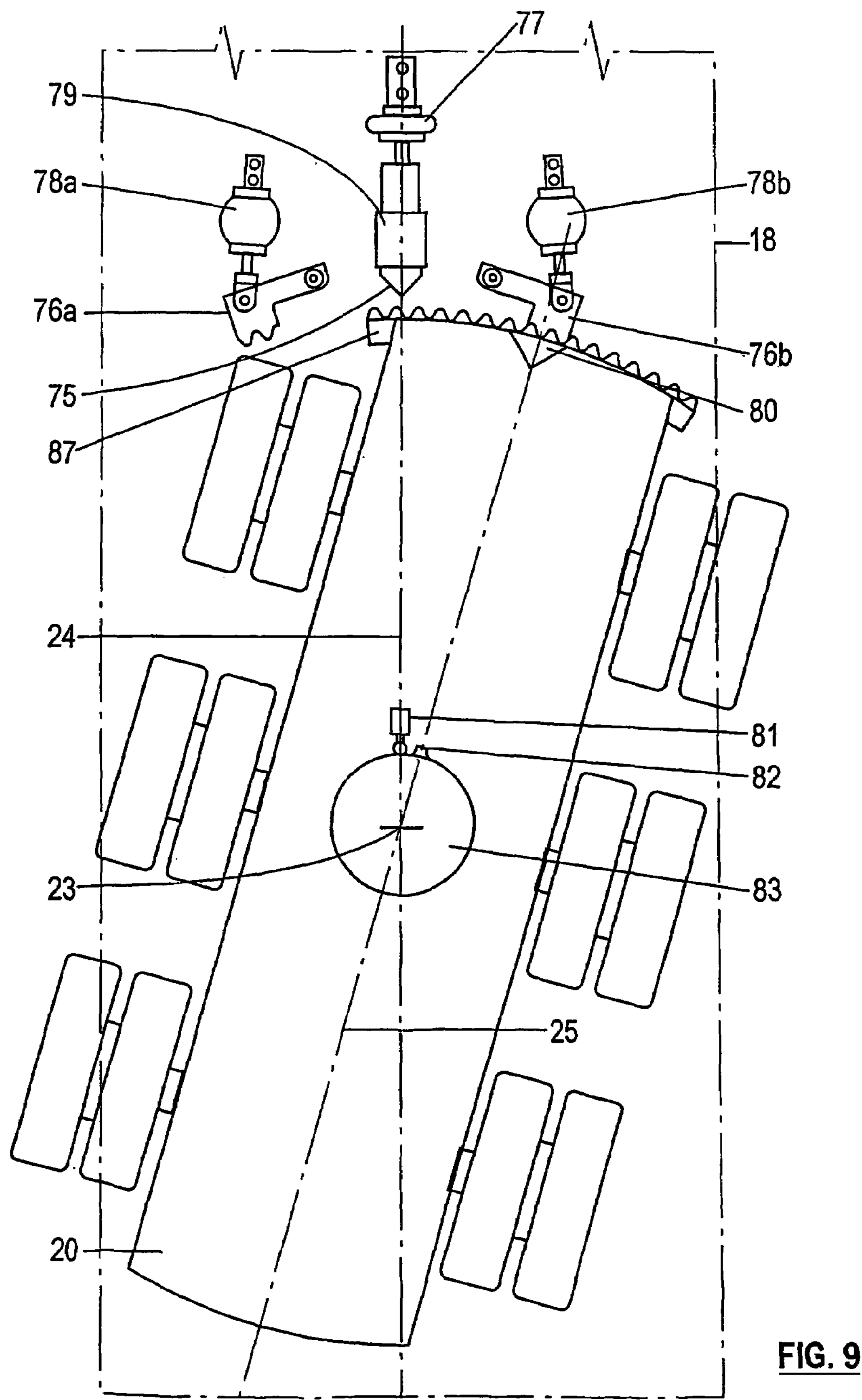
FIG. 9 is a schematic partial plan view of the vehicle shown in FIG. 3.

This part of the disclosure will refer to vehicle 15 and variable stop system 60, but it is equally applicable to vehicle 29 and to the alternative variable stop system 410/411. It is desirable to provide for locking of sub-chassis 20 to the main chassis 18 in particular circumstances. High speed forward travel is an example where it can be desirable to have the sub-chassis 20 locked to the main chassis 18 with axes 24 and 25 aligned. In this situation, deviations from straight-ahead positions of the prime mover 16 and sub-chassis 20 are very limited. FIG. 9 (from which extraneous mechanical detail has been omitted) shows sub-chassis 20 with a tongue 75 and locking segments 76*a* and 76*b*, operable by pneumatic actuators 77, 78*a* and 78*b* respectively, which are anchored to main chassis 18.

Tongue 75 slides in a guide 79 fixed to main chassis 18, and is for locking sub-chassis 20 in the straight-ahead position, by entering cooperating recess 80 in sub-chassis 20.

An air valve 81 fixedly mounted to the main chassis 18 is operable by a formation 82 on a cam plate 83 secured to sub-chassis 20, whenever the axes 24 and 25 are within a small predetermined angle of perfect alignment. A further air valve 84 is also fixedly mounted to the main chassis 18 (see FIGS. 6, 11) and operated by a formation 85 on an extension 86 of the radius arm 120 (or by a formation 437 on the front of cam plate 423 in the case of subsystem 411—see FIG. 16) whenever the axes 24 and 28 are within a small predetermined angle of perfect alignment. By suitably connecting an air supply (not shown, and normally on the prime mover), the valves 81 and 84, and pneumatic actuator 77, actuator 77 causes tongue 75 to move into recess 80 and lock sub-chassis 20 and main chassis 18 together. If a sufficiently large steering input is made to rotate extension 86 of arm 120 and change the state of valve 84, tongue 75 is withdrawn and the sub-chassis 20 can then rotate about axis 23.

It is of course possible by routine means to provide that once sub-chassis 20 is locked in the straight-ahead position as above, a deliberate operator input (other than mere steering) is required for unlocking. Thus, the vehicle 15 can if required be made to operate in the same way as the conventional vehicle 1. A user may in this way lock sub-chassis 20 in the straight-ahead position for reversing.

Irrespective of whether axes 24 and 25 are aligned, sub-chassis 20 should be automatically locked to main chassis when the prime mover 16 is in reverse gear. Locking segments 76*a* and 76*b* are provided for this. When actuated by actuators 78*a* and 78*b*, they pivot rearward so that at least one engages an arcuate rack 87 on sub-chassis 20.

Reversing can thus be done with the sub-chassis 20 and main chassis 18 aligned, if required, or with sub-chassis 20 locked in an articulated position, for example for tight reverse manoeuvres.

Alternatively, either or both of valves 81 and 84, 88*a* may be replaced by electric switches or other suitable transducers and the above functionality achieved by routine means using a suitable combination of electric/electronic and pneumatic circuitry. In a particularly simple arrangement, the reversing light circuit can be used to cause locking segments 76*a* and 76*b* to operate. Alternatively, a separate and dedicated circuit may be used.

Alternative Sub-chassis Arrangement

Figure 10:
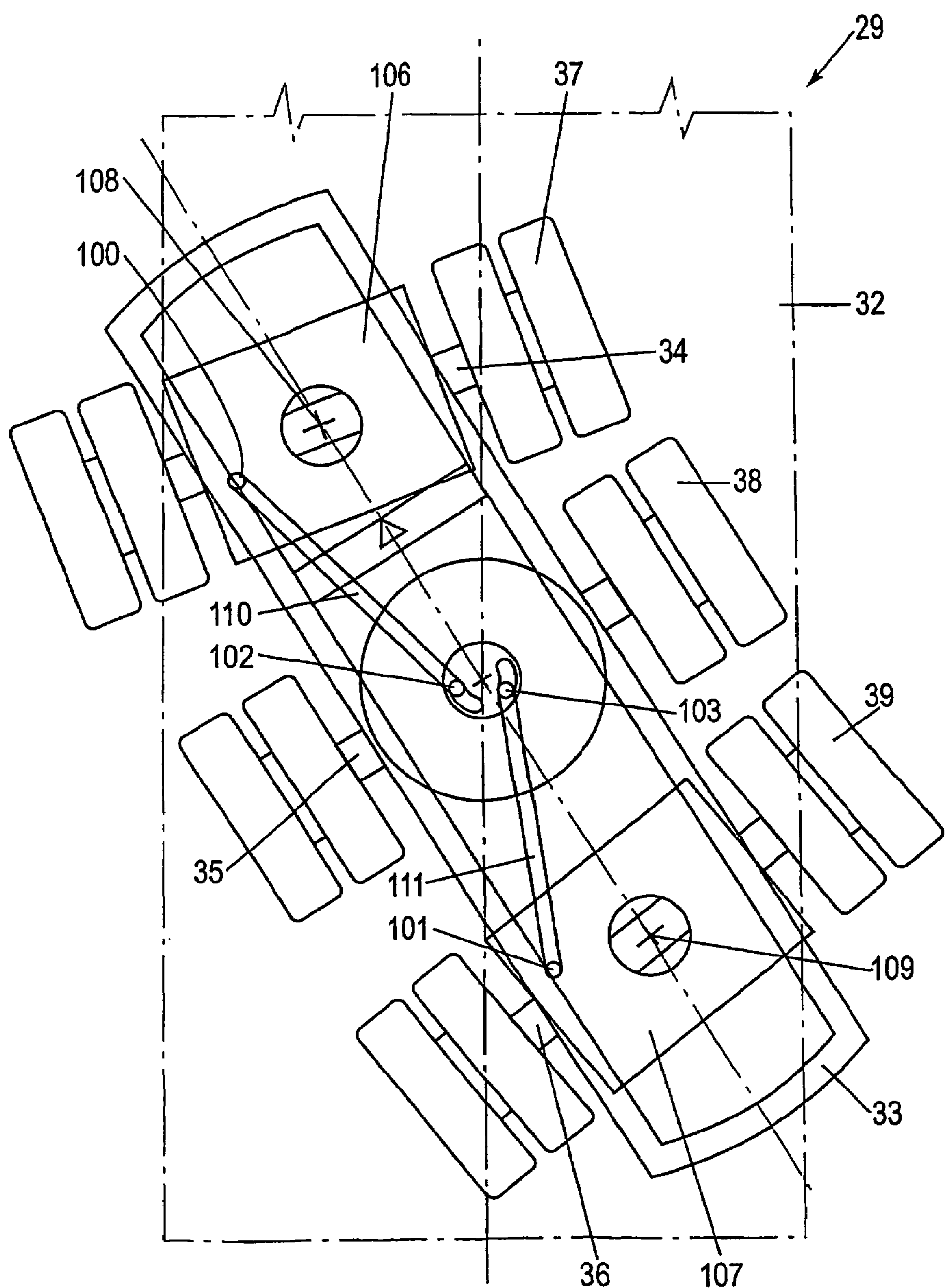
FIG. 10 is a schematic partial plan view of the vehicle shown in FIG. 4.
Figure 15:
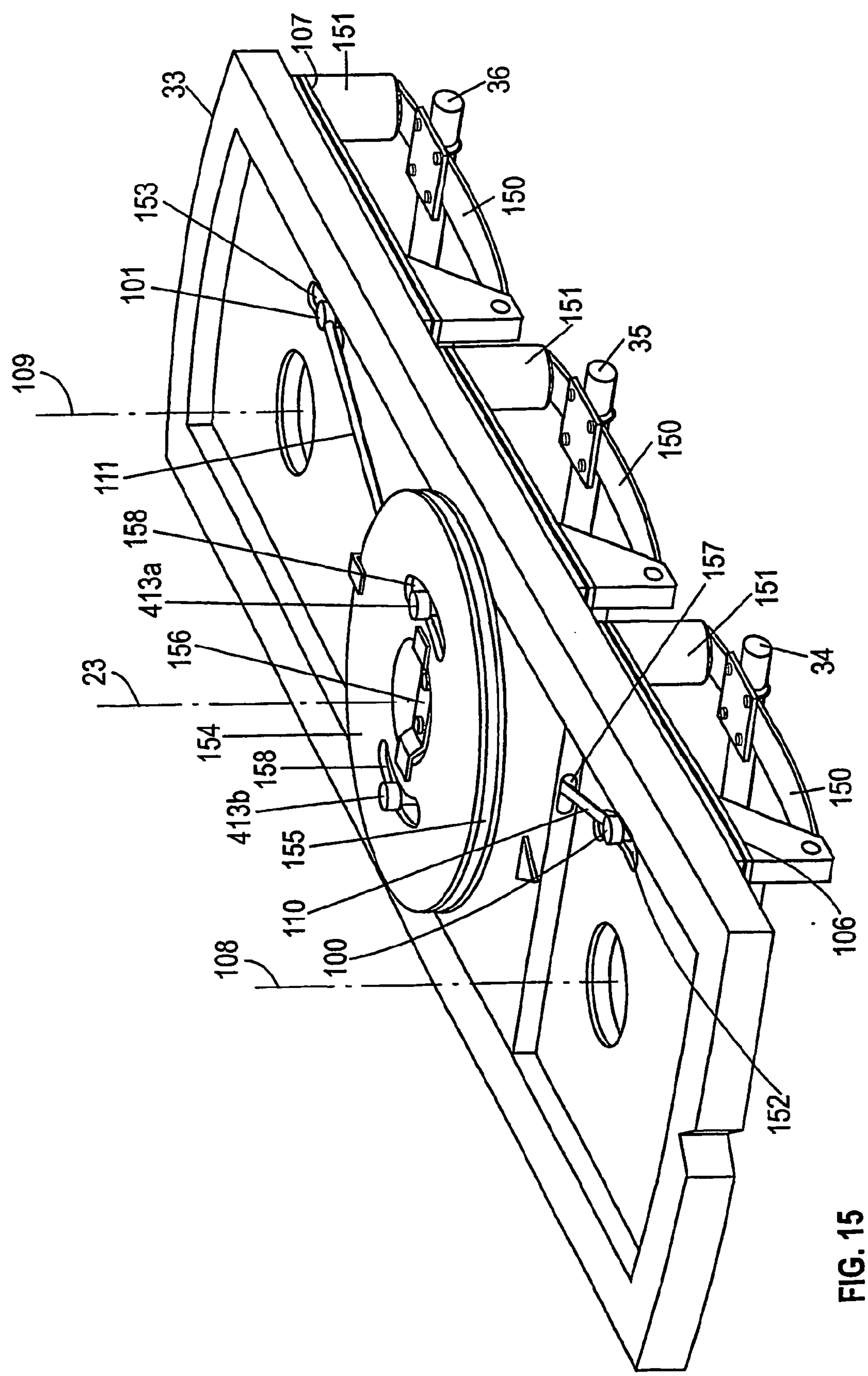
FIG. 15 is a perspective view of a sub-chassis for use in the invention.

The sub-chassis 33 of the vehicle 29 will now be described, in particular the means whereby the rigid axles 34 and 36 are aligned responsively to pivoting of the sub-chassis 33 relative to main chassis 32, so that wheels 37 and 39 "steer" in the correct sense. FIG. 10 shows sub-chassis 33 schematically in plan view with extraneous mechanical detail omitted. FIG. 15 shows sub-chassis 33 in one possible form, adapted for use with the mechanical/hydraulic variable stop means described above (subsystems 410 and 411).

Central, non-steering rigid axle 35 is mounted transversely to the sub-chassis 33 in conventional manner as known in the art, i.e. with a resilient suspension to allow substantially vertical movement of axle 35 for absorption of road unevenness, but with the axle 35 always remaining substantially transverse to the sub-chassis 33. Axle 35 is shown (FIG. 15) as being mounted via leaf springs 150 and spring/damper units 151, but other arrangements are known in the art and may be used.

The steerable rigid axles 34 and 36 and their wheels 37 and 39 respectively are mounted in essentially the same way to frames 106 and 107 respectively as axle 35 is mounted to sub-chassis 33. Frames 106 and 107 are mounted beneath sub-chassis 33 and are pivotable about upright axes 108 and 109 in the sub-chassis 33, for steering orientation of axles 34 and 36 and wheels 37 and 39. The mounting of axles 34 and 36 to frames 106 and 107 is by the same means as that of axle 35 to sub-chassis 33, namely via leaf springs 150 and spring/damper units 151—see FIG. 15.

Links 110 and 111 respectively connect frames 106 and 107 to the main chassis 32. Links 110 and 111 connect pivots 100 and 101 secured to frames 106 and 107 respectively to pivots 102 and 103 respectively on main chassis 32. By suitable choice of locations of pivots 100 and 101 on frames 106 and 107 and pivots 102 and 103 on main chassis 32, for example as shown in FIG. 10, pivoting steering of wheels 37 and 39 in the requisite sense relative to sub-chassis 33, is obtainable.

In FIG. 15, pivots 100 and 101 are shown, and extend upwards from frames 106 and 107 through slots 152 and 153 to links 110 and 111. Sub-chassis 33 is mounted to main chassis 32 via a plate 154 with a swing circle bearing 155 below. Pivots 102 and 103 are obscured in FIG. 15, but are secured to the base of a member 156 which is itself secured to plate 154. Links 110 and 111 pass through clearance slots 157 in the structure of sub-chassis 33. Pivots 413*a* and 413*b* of subsystem 410 are shown extending upward from sub-chassis 33 through slots 158.

In selecting pivot locations for the links 110 and 111, it is important to ensure that, as sub-chassis 33 pivots, the angle between sub-chassis 33 and main chassis 32 is in fact limited by the variable stop means 410/411 (or 60). If the angles between axes 40 and 41, and 41 and 42, (see FIG. 4) increase too quickly with increases in the stop-limited angle 159' between sub-chassis 33 and main chassis 32, this will not occur. A lesser degree of self-steering is required, so that the sub-chassis 33 still pivots to an angle 159' limited by the variable stop system but with less wheel scrubbing than in the case of the vehicle 15. The choice of suitable locations for pivot points 100, 101, 102, 103 and lengths of links 110 and 111 can be made by simple trial and error to achieve suitable degrees of rotation of the axles 34 and 36 for given degrees of rotation of sub-chassis 33 for a given vehicle geometry.

Connection of Prime Mover to Variable Stop Means

The variable stop means (system 60 or 410/411) are operated by a connection between the prime mover (16 or 30) and main trailer chassis (18 or 32). This will now be described, firstly by reference to system 60.

Figure 11:
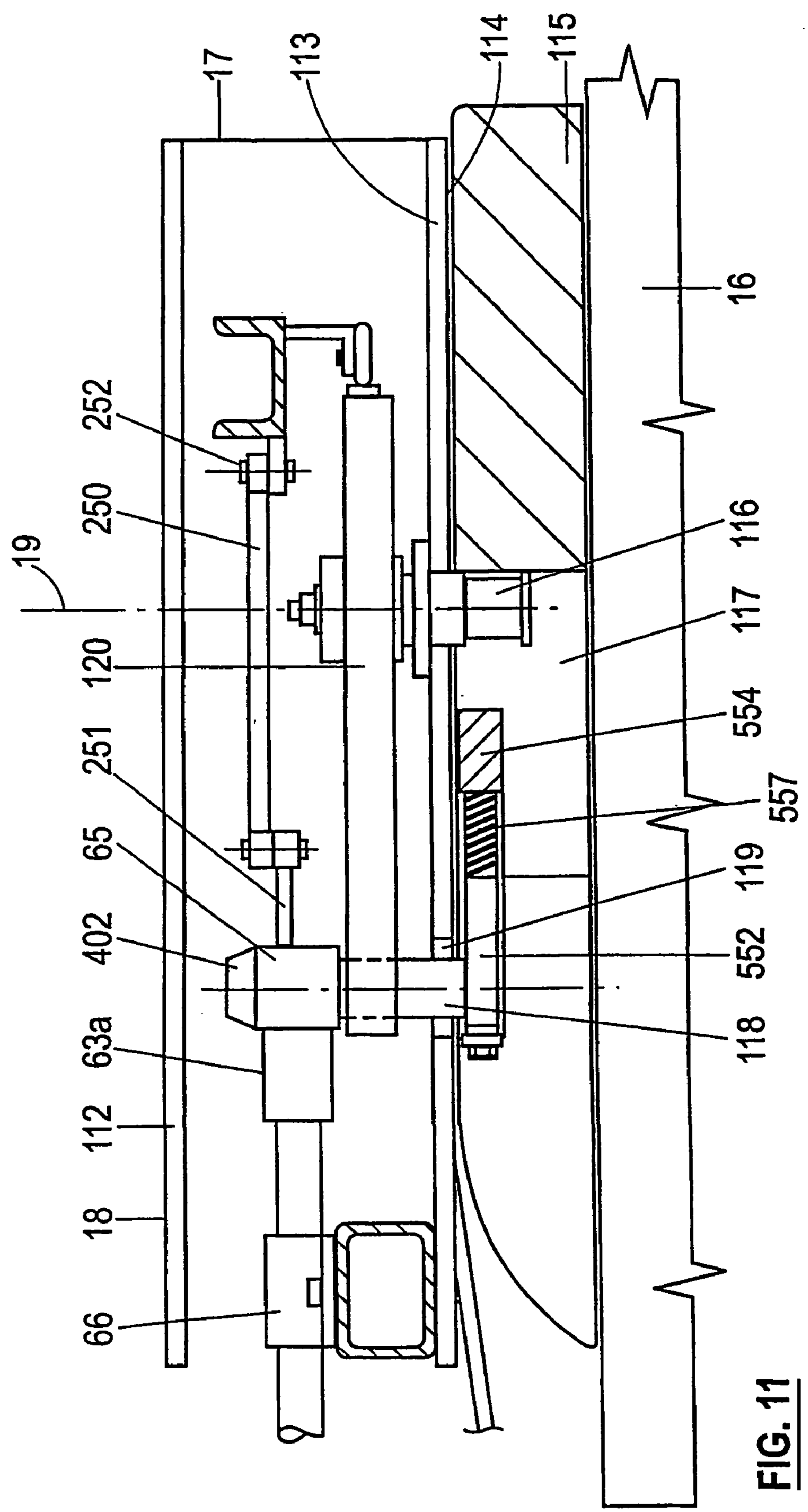
FIG. 11 is a partial cross-section of the vehicle shown in FIG. 6 taken at station "BB" therein.
Figure 12:
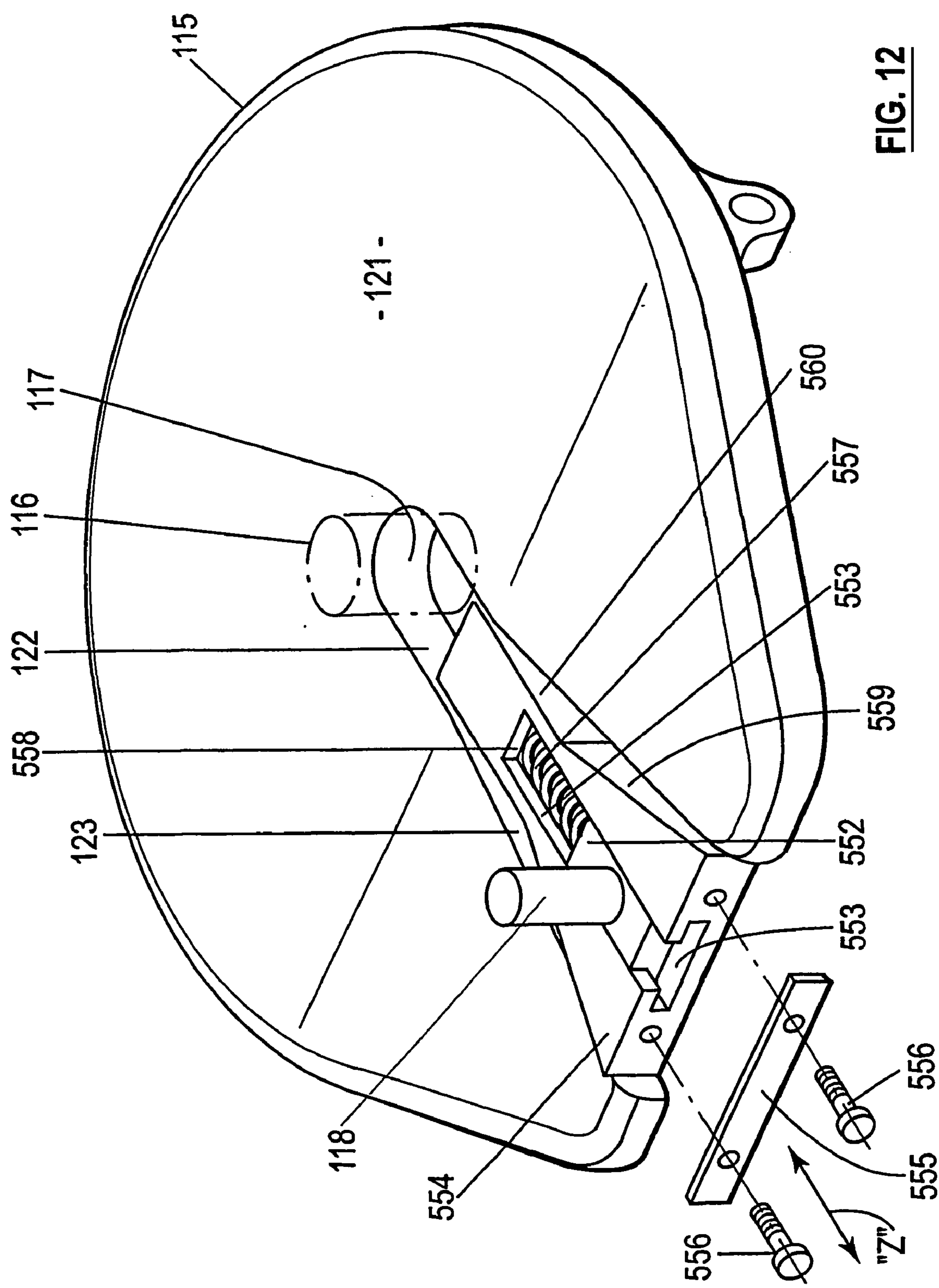
FIG. 12 is a partially exploded perspective view of a part of the vehicle shown in FIG. 3.

FIGS. 11 and 12 show components whereby the slider 65 in variable stop means 60 is caused to rotate around axis 19 in concert with prime mover 16 pivoting relative to trailer 17. (Reference is here being made for convenience to vehicle 15, but the arrangement described below is equally applicable to vehicle 29.)

As best seen in FIG. 11, from which some extraneous mechanical and structural detail has been omitted, the yokes 63*a* and 63*b* and the slider 65 lie between upper plate 112 of the main chassis 18 and a skid plate 113, whose lower surface 114, in use of the trailer 17, rests on "fifth wheel" 115 of the prime mover 16. A king pin 116 secured to the trailer 17 and depending from the skid plate 113 is received and locked in a cooperating recess 117 of the fifth wheel 115 in conventional manner.

A drive pin 118 parallel to the king pin 116 passes up through an arcuate slot 119 in the skid plate 113, and is secured to radius arm 120 which is mounted to, and free to rotate about, an upper part of the king pin 116 and lies between the upper plate 112 and the skid plate 113. The drive pin 118 is secured to fifth wheel 115 of prime mover 16 in a manner described below so that as the prime mover 16 pivots about the king pin 116, the drive pin 118 revolves in concert with prime mover 16 around king pin 116. The arcuate slot 119 is centred on the king pin 116 and is long enough to accommodate the maximum permitted degree of relative articulation of the trailer 17 and prime mover 16.

Slider 65 is mounted to an upper extension of the pin 118, and is free to rotate around it.

Figure 16:
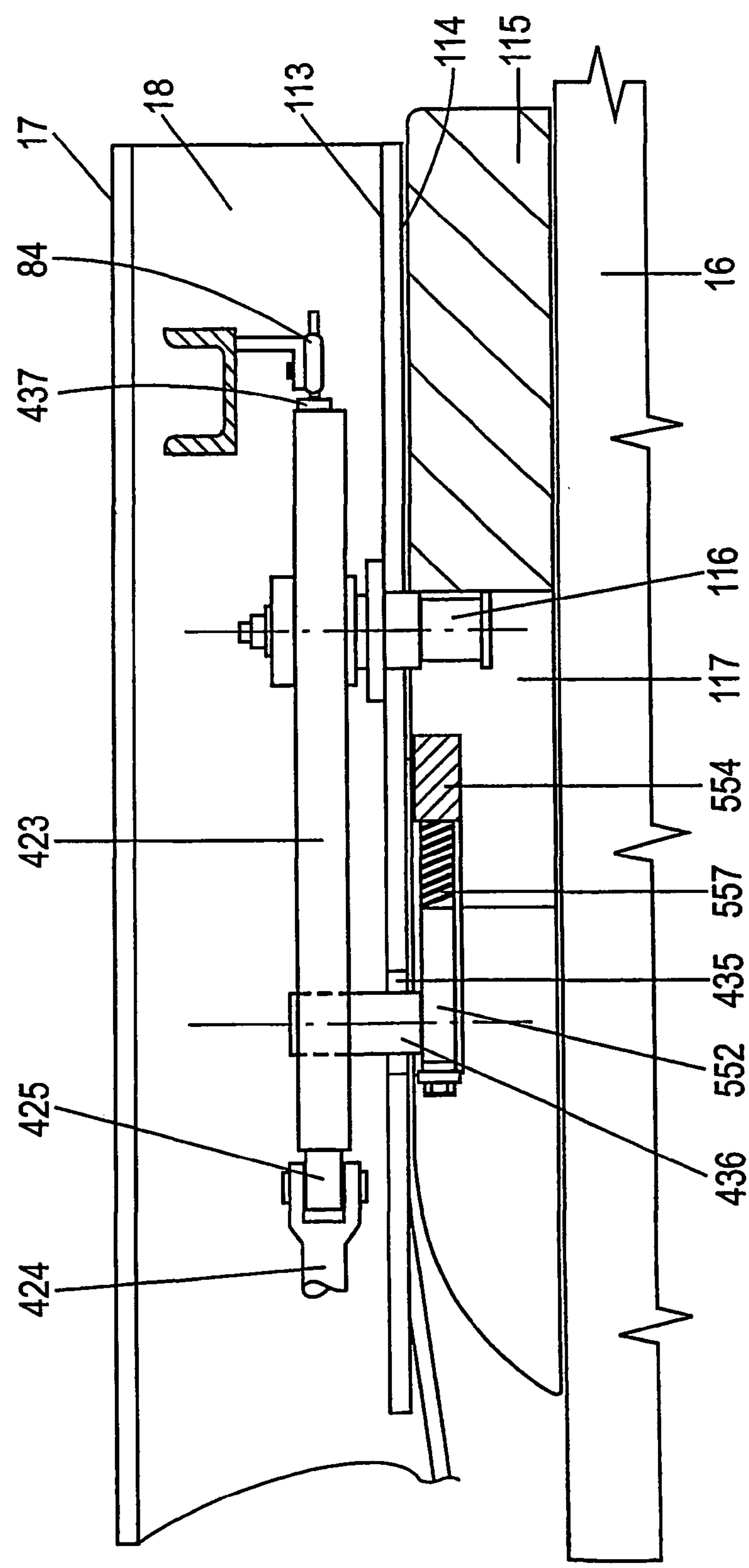
FIG. 16 is a partial cross-section of the trailer of the vehicle shown in FIG. 3, taken on the longitudinal centreline thereof, when fitted with an alternative variable stop means according to the invention.

For the alternative system 410/411, a simpler but similar arrangement is provided—see FIG. 16. Cam plate 423 is mounted in identical fashion to radius arm 120, for rotation about axis 19, and drive pin 436 is secured to the base of cam plate 423 and extends downwards through an arcuate slot 435 in skid plate 113. Drive pin 436 and slot 435 serve the same functions as drive pin 118 and slot 119.

The manner in which the drive pin 118 (or 436) is secured in a fixed position relative to the fifth wheel 115 will now be described.

FIG. 12 shows the fifth wheel 115 (only) of the prime mover 16, which is of a standardized type well known in the art, having an upper surface 121 on which the skid plate 113 of the trailer 17 rests and having a recess 117 for receipt of the king pin 116. The recess 117 lies at a front end of a parallel-sided slot 122 in the fifth wheel 115, and behind the slot 122 is a tapered slot 123. When the trailer 17 is to be connected to the prime mover 16, the tractor reverses underneath the front end of the trailer 17 (which is supported at a suitable height for the purpose in conventional manner) so that the trailer's king pin 116 enters the tapered slot 123, then the slot 122, and is finally received (and locked by known means, not shown) in the recess 117. Finally the front end of trailer 17 is lowered a little, so that its skid plate 113 sits on upper surface 121 of the fifth wheel 115. This procedure is the same as the procedure that would be followed for a conventional trailer.

Secured to the drive pin 118 at its lower end is a slider 552 which is free to slide in a cooperating slot 553 in a wedge member 554. The direction in which the slider 552 is free to slide in member 554 is indicated by arrow "z" in FIG. 12. The slider 552 is retained captive in slot 553 by a retainer plate 555 secured to the wedge member 554 by bolts 556. A coil spring 557 is located in the slot 553 between the slider 552 and a face 558. The wedge member 554 has a tapered section 559 and a parallel sided front section 560. When the trailer 17 is not connected to prime mover 16, the wedge member 554 is held captive immediately below the skid plate 113, because pin 118 is secured to slider 552. As the procedure described in the preceding paragraph for mating trailer 17 with prime mover 16 is followed, the wedge member 554 enters the tapered slot 123 of the fifth wheel 115. When the kingpin 116 reaches recess 117, the parallel-sided section 560 is received (and closely fits) in parallel-sided slot 122. The tapered section 559 is received in the tapered slot 123. The spring 557 forces wedge member 554 as far forward as it will go into the slots 122 and 123 and holds it there firmly, while drive pin 118 is held at its correct radius relative to the king pin 116 by radius arm 120.

In this way, the trailer 17 carries all the main mechanical components specific to steering of the rear sub-chassis 20, and the prime mover 16 can be conventional, with no major mechanical modification required for operation with the inventive trailer 17 (other than provision of a compressed air supply for the pneumatic components and minor pneumatic and/or electric components described above). This is an important practical advantage. The tapered section 559 of the wedge member 554 may (and ideally does) taper in such a way as to match the taper of the tapered slot 123 in fifth wheel 115. However, although the width of the parallel-sided slot 122 is standardized, various tapers are used in the tapered slots (such as 123) of fifth wheels, and it is desirable for one wedge member to be usable with a range of fifth wheels. To this end, the tapered section 559 of the wedge member 554 may have a taper corresponding to the maximum taper expected in practice, yet still be usable with fifth wheels having more narrowly tapered slots because the spring 557 causes the wedge member 554 to be forced as far forward in the fifth wheel 115 as it can go. The parallel-sided front section 560 is still received and firmly held in the slot 122. The variation which can be accommodated in practice depends on the need for the parallel-sided front section 560 to be received far enough into the slot 122. This method of provision of a steering "input" to a trailer without any requirement for modification of its tractor is inventive in itself.

It is of course possible to remove wedge member 554 from the slider 552 by removing plate 555 and simply sliding it off, and to then slide on to slider 552 a new wedge member 554 of different taper, compress the spring 557 and replace plate 555.

Many variations to the above embodiments may be made without departing from the spirit and scope of the invention.

The invention claimed is:

1. A trailer for use as part of an articulated vehicle, the trailer including:

a main chassis pivotally connectable to a wheeled section of the vehicle immediately ahead of the trailer so that said wheeled section can articulate relative to said main chassis about a substantially upright first axis in the main chassis;

a sub-chassis having a plurality of pairs of ground-engaging wheels mounted thereto and longitudinally spaced apart theralong, said sub-chassis being connected to the main chassis for free pivoting about a substantially upright second axis in the main chassis;

stop means adapted to define a maximum angle of said free pivoting by said sub-chassis away from a position of longitudinal alignment with said main chassis, said maximum angle being dependent on the positioning of said stop means relative to said main chassis;

stop positioning means for automatically positioning said stop means relative to said maximum angle is variable according to the positioning of said stop means;

steering means responsive to relative rotation of said sub-chassis and said main chassis about said second axis for steering at least two said pairs of steerable wheels relative to said sub-chassis in such a sense as to tend to align said sub-chassis longitudinally with said main chassis, each of said at least two pairs of steerable wheels being mounted to a respective rigid axle assembly, each said axle assembly being pivotally mounted to said sub-chassis, each of said at least two pairs of wheels being steerable by pivoting of said axle assembly about a substantially upright third axis in said sub-chassis, in an opposing direction to an adjacent said pair of steerable wheels; and first locking means whereby when said sub-chassis is in longitudinal alignment with said main chassis and any angular deviation from longitudinal alignment of said wheeled section and said mean chassis is less than a specified value said locking means is operable to hold said sub-chassis and said main chassis in longitudinal alignment.

2. A trailer according to claim 1, wherein said first locking means has a user-selectable mode of operation whereby said sub-chassis is maintained in longitudinal alignment with said main chassis for only so long as said angular deviation from longitudinal alignment of said wheeled section and said main chassis remains less than said specified value.

3. A trailer according to claim 1, wherein said steering means includes a first link connecting said axle assembly and said main chassis or a part secured to said main chassis.

4. A trailer according to claim 1, including further stop means for limiting to a fixed maximum value an angular rotation of said sub-chassis about said second axis and away from said position of alignment with said main chassis.

5. A trailer according to claim 1, including second locking means which for so long as a reverse gear of said articulated vehicle is engaged locks said sub-chassis and said main chassis at such relative angular deflection about said second axis as exists when said reverse gear is engaged.

6. An articulated vehicle including a trailer according to claim 1.

7. A trailer according to claim 1, further including:

a member arranged for movement in response to rotation of said sub-chassis about said second axis; and movement transmitting means whereby said movement of said member causes a corresponding movement of a follower means, and wherein said corresponding movement of said follower means is limited by said stop means.

8. A trailer according to claim 7, wherein said movement transmitting means includes first and second hydraulic actuators operatively interconnected by hydraulic fluid conduits so that actuation of said first actuator by said movement of said member produces a corresponding movement by said second actuator of said follower means.

9. A trailer according to claim 8, further including a vessel having an internal space in fluid communication with a hydraulic fluid conduit connecting said hydraulic actuators and means whereby a volume of said space increases as hydraulic fluid pressure in said space increases.

10. A trailer according to claim 7, including an elongate telescopic link having a predetermined minimum length when fully inwardly telescoped, said telescopic link when telescoped to said minimum length causing said movement of said member in response to said rotation of said sub-chassis in a particular direction.

11. A trailer according to claim 10, wherein said telescopic link is one of two such telescoping links respectively disposed to cause said movement of said member in response to said rotation of said sub-chassis in opposing first and second directions, and wherein as one said link causes said movement of said member the other said link telescopically extends in length.

12. A trailer according to claim 7, wherein said stop means includes a cam arranged to rotate in said main chassis about said first axis and adapted to be operatively coupled to said wheeled section.

13. A trailer for use as part of an articulated vehicle, the trailer including:

a main chassis pivotally connectable to a wheeled section of the vehicle immediately ahead of the trailer so that said wheeled section can articulate relative to said main chassis about a substantially upright first axis in the main chassis;

a sub-chassis having a plurality of pairs of ground-engaging wheels mounted thereto and longitudinally spaced apart therealong, said sub-chassis being connected to the main chassis for free pivoting about a substantially upright second axis in the main chassis;

stop means adapted to define a maximum angle of said free pivoting by said sub-chassis away from a position of longitudinal alignment with said main chassis, said maximum angle being dependent on the positioning of said stop means relative to said main chassis;

stop positioning means for automatically positioning said stop means relative to said main chassis in response to articulation of said wheeled section about said first axis so that said maximum angle is variable according to the positioning of said stop means;

steering means responsive to relative rotation of said sub-chassis and said main chassis about said second axis for steering at least one said pair of wheels relative to said sub-chassis in such a sense as to tend to align said sub-chassis longitudinally with said main chassis; and first locking means whereby when said sub-chassis is in longitudinal alignment with said main chassis and any angular deviation from longitudinal alignment of said wheeled section and said main chassis is less than a specified value said locking means is operable to hold said sub-chassis and said main chassis in longitudinal alignment.

* * * * *